United States Patent
Ueoka

(10) Patent No.: US 8,315,982 B2
(45) Date of Patent: *Nov. 20, 2012

(54) METHOD, APPARATUS, PROGRAM AND SYSTEM FOR MIGRATING NAS SYSTEM

(75) Inventor: Atsushi Ueoka, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,357

(22) Filed: Aug. 18, 2011

(65) Prior Publication Data

US 2011/0302139 A1 Dec. 8, 2011

Related U.S. Application Data

(63) Continuation of application No. 12/188,487, filed on Aug. 8, 2008, now Pat. No. 8,019,726.

(30) Foreign Application Priority Data

May 28, 2008 (JP) ................................ 2008-138853

(51) Int. Cl.
    *G06F 17/30* (2006.01)
(52) U.S. Cl. .......... 707/644; 707/E17.007; 707/E17.044
(58) Field of Classification Search .................. 707/204, 707/644

See application file for complete search history.

(56) References Cited

U.S. PATENT DOCUMENTS

| | | | |
|---|---|---|---|
| 5,991,753 A * | 11/1999 | Wilde | 1/1 |
| 7,734,593 B2 * | 6/2010 | Prahlad et al. | 707/640 |
| 2006/0020636 A1 | 1/2006 | Murotani | |
| 2006/0061652 A1 | 3/2006 | Sato et al. | |
| 2006/0129654 A1 * | 6/2006 | Sato | 709/213 |
| 2008/0028164 A1 * | 1/2008 | Ikemoto et al. | 711/154 |
| 2008/0235300 A1 * | 9/2008 | Nemoto et al. | 707/204 |

FOREIGN PATENT DOCUMENTS

| | | |
|---|---|---|
| JP | 04243437 | 8/1992 |
| JP | 2000-187608 | 7/2000 |
| JP | 2002268931 | 9/2002 |
| JP | 2006039814 | 2/2006 |
| JP | 2006084963 | 3/2006 |

* cited by examiner

*Primary Examiner* — Shyue Jiunn Hwa
(74) *Attorney, Agent, or Firm* — Brundidge & Stanger, P.C.

(57) ABSTRACT

In a state where the migration source NAS apparatus is continuously operated, a migration processing program confirms the update date and time of files stored in the migration source NAS apparatus, and migrates only the files that were not updated from a specific time to the start date and time of migration processing. Or, the migration processing program migrates the files stored in the migration source NAS apparatus sequentially from the oldest file. The migration performance is calculated based on the capacity and migration time of the migrated files, and the time required for migrating the non-migrated files is calculated based on the size and migration performance of the non-migrated files.

14 Claims, 17 Drawing Sheets

| NAS-ID | MIGRATION SOURCE IP | MIGRATION SOURCE SHARE | MIGRATION DESTINATION IP | MIGRATION DESTINATION SHARE |
|---|---|---|---|---|
| ID-001 | 192.168.10.11 | Share1 | 192.168.10.21 | Share1 |
| ID-002 | 192.168.10.11 | Share2 | 192.168.10.21 | Share2 |
| ID-003 | 192.168.10.12 | Share3 | 192.168.10.22 | Share3 |
| ... | ... | ... | ... | ... |

| NAS-ID | START DATE AND TIME | END DATE AND TIME | MIGRATION EXCLUSION UPDATE PERIOD |
|---|---|---|---|
| ID-001 | 2008/1/2 20:00 | 2008/1/3 7:00 | 24 HOURS |
| ID-001 | 2008/1/3 20:00 | 2008/1/4 7:00 | 24 HOURS |
| ID-001 | 2008/1/4 20:00 | 2008/1/6 7:00 | 24 HOURS |
| ID-001 | 2008/1/7 20:00 | 2008/1/8 7:00 | 48 HOURS |
| ID-001 | 2008/1/9 20:00 | | 0 |
| ... | ... | ... | ... |

FIG.10

| STATUS | TARGET FILE | FILE SIZE | COPYING TIME |
|---|---|---|---|
| COPIED | /dir1/file1 | 1,024 | 2 |
| COPIED | /dir1/file2 | 4,096 | 8 |
| EXCLUDED | /dir1/file3 | 2,048 | |
| EXCLUDED | /dir2/file1 | 8,192 | |
| SAME | /dir2/file2 | 1,024 | |
| COPIED | /dir3/file1 | 2,048 | 4 |

40

```
/dir1/file2
/dir1/dir2/dir3/file1
/dir2/dir4/file5
/dir1/file1
```
90

METHOD, APPARATUS, PROGRAM AND SYSTEM FOR MIGRATING NAS SYSTEM

CROSS-REFERENCES

This application is a continuation application of U.S. application Ser. No. 12/188,487 filed on Aug. 8, 2008, now U.S. Pat. No. 8,019,726, the entirety of which is incorporated herein by reference.

This application relates to and claims priority from Japanese Patent Application No. 2008-138853, filed on May 28, 2008, the entire disclosure of which is incorporated herein by reference.

BACKGROUND

The present invention relates to a method, apparatus, program and system for migrating a NAS system.

A storage apparatus as represented by a disk array apparatus logically partitions the storage area of disk devices in the storage apparatus and provides the partitioned storage areas to a host computer as volumes. This kind of storage apparatus is connected to a network, and the host computer is connected to the storage apparatus via the network so as to access the volumes in a block format or a mainframe CKD format. Moreover, a NAS (Network Attached Storage) apparatus is known as one means for providing volume access in a file format to the host computer via the network. In a NAS apparatus, an OS (Operating System) and a file system are operated to retain information concerning the files and directories stored in the respective volumes provided by the storage apparatus, and implement the input and output of files according to a request from the host computer.

If there is performance deterioration or capacity shortage in this kind of NAS apparatus, a method of migrating data of the existing NAS apparatus to the new NAS apparatus to continue the operation may be considered.

As a conventional migration method of a storage apparatus, disclosed is a method of enabling access from the storage apparatus to be newly installed to the existing storage apparatus, and the newly installed storage apparatus processing a block access request from the host computer while migrating block data from the existing storage apparatus (Japanese Patent Laid-Open Publication No. 2000-187608).

SUMMARY

With a migration method concerning a storage apparatus that provides block access, a case is now considered regarding the foregoing conventional method where a NAS apparatus is respectively connected to the existing storage apparatus and the newly installed storage apparatus. In the case of the migration method described in the foregoing patent document, when a file write request is received from the host computer during the migration processing, that file is written into the newly installed NAS apparatus and the newly installed NAS apparatus writes the same file in the existing NAS apparatus. Thereby, even if the migration processing ends in a failure, operation can be continued with the existing NAS apparatus. Nevertheless, with this method, there is a problem in that the file must be written into two NAS apparatuses in response to a write request of a single file, and the write performance will deteriorate.

In light of the above, an object of the present invention is to provide a method, apparatus, program and system for migrating a NAS system configured from one or more NAS apparatuses and one or more storage apparatuses.

According to one embodiment of the present invention, provided is a file migration method of an information system including a first NAS system, a second NAS system, and a computer for reading and writing a plurality of files stored in the first NAS system. This file migration method of the information system includes a step of acquiring and storing first attribute information including file names and update time information concerning a plurality of files to be stored in a designated directory and below of the first NAS system, a step of acquiring and storing second attribute information including file names and update time information concerning a plurality of files stored in the second NAS system, a step of identifying a file to be copied from the first NAS system to the second NAS system based on the difference between the stored first attribute information and second attribute information, and a prescribed rule concerning the update time information of the first attribute information, and a step of copying the identified file from the first NAS system to the second NAS system.

As an example of a computer, there is a NAS client that accesses the first NAS system. Update time information is information that shows the timing that the file was updated, and the form of presentation may be year, month, day, hour, minute, second or day of the week, and it may also be the relative time from a certain reference time. It is thereby possible to avoid the performance deterioration of the writing requested by the client computer. In addition, it is also possible to avoid the repeated execution of migration copy of files that are frequently updated, and migration of the NAS system can be implemented in a short time.

As the prescribed rule, a file with old update time information of the first attribute information may be preferentially identified as a file to be copied to perform efficient copying from a file with old update time which is less likely to be updated again. As another prescribed rule, based on a first time obtained by subtracting a predetermined migration exclusion update period from the execution time of the file migration processing and the update time information of the first attribute information, by identifying a file updated after the first time as a copy inhibition target, a file to be copied can be identified with a smaller load than the former method. There is no particular limitation on the execution sequence of the difference between the first attribute information and the second attribute information (as examples, information showing files that exist in the first NAS system but do not exist in the second NAS system, and information showing that the file exists in both NAS systems but the update of the file of the first NAS system has not been reflected in the file of the second NAS system) and the prescribed rule, and either the difference or prescribed rule may be executed first. The first attribute information and the second attribute information may be stored in either information system. In addition, since it is not necessary to constantly store the update time information of all files concerning the designated directory of the first NAS system, for instance, a part of the update time information and file names of a plurality of files may be temporarily stored as the first attribute information and the second attribute information in a migration computer (for example, a migration server or a part of the NAS client).

Moreover, if the NAS system is able to store files set with WORM, the acquired first attribute information includes information concerning a WORM setting of a plurality of files stored in a designated directory and below of the first NAS system, and the step of copying the identified file from the first NAS system to the second NAS system may also include a step of setting a WORM to the file copied to the second NAS system according to information concerning the WORM setting included in the first attribute information. Migration of a NAS system including files set with WORM is thereby enabled.

Further, the acquired second attribute information includes information concerning the WORM setting of the file copied to the second NAS system, and the file migration method may further comprise a step of identifying a file set with WORM from the second attribute information, and a step of excluding the identified file set with WORM from the acquisition target of the first attribute information. Since the files set with WORM will not be updated in the first NAS system, the migration process can be sped up since the amount of information to be acquired from the first NAS system can be reduced.

In addition, the step of copying the identified file from the first NAS system to the second NAS system includes a step of recording the copying time and file size of the copied file, and the file migration method may further comprise a step of identifying the total file size concerning files to be copied before the end of migration among a plurality of files stored in a designated directory and below of the first NAS system, and a step of providing migration period information based on the copying time, the file size and the total file size. Thereby, the administrator who uses the migration method of the present invention will be able to estimate the time required until the completion of migration. Although a method of displaying a display device of a migration server can be considered as a method of providing migration period information, migration period information may be sent to another computer for displaying this on a different computer based on such information, or the migration period information may be sent to a program that is being executed in another computer.

Although the foregoing invention may be executed with any component of the information system, in particular, if the present invention is executed with the second NAS system, acquisition of the second attribute information and file copy can be performed at high speed. In addition, by executing the present invention with a migration computer connected to the first NAS system and the second NAS system, the present invention can also be applied to a NAS system that is not equipped with a migration function, and the load associated with the migration process (for instance, acquisition and storage of attribute information and application of prescribed rules) can be alleviated.

The present invention is able to avoid the deterioration in write performance of the NAS apparatus associated with migration.

DESCRIPTION OF DRAWINGS

FIG. 10 is an example of a format of an execution result log;

DETAILED DESCRIPTION

Embodiments of the present invention are described below.

First Embodiment

Figure 1:
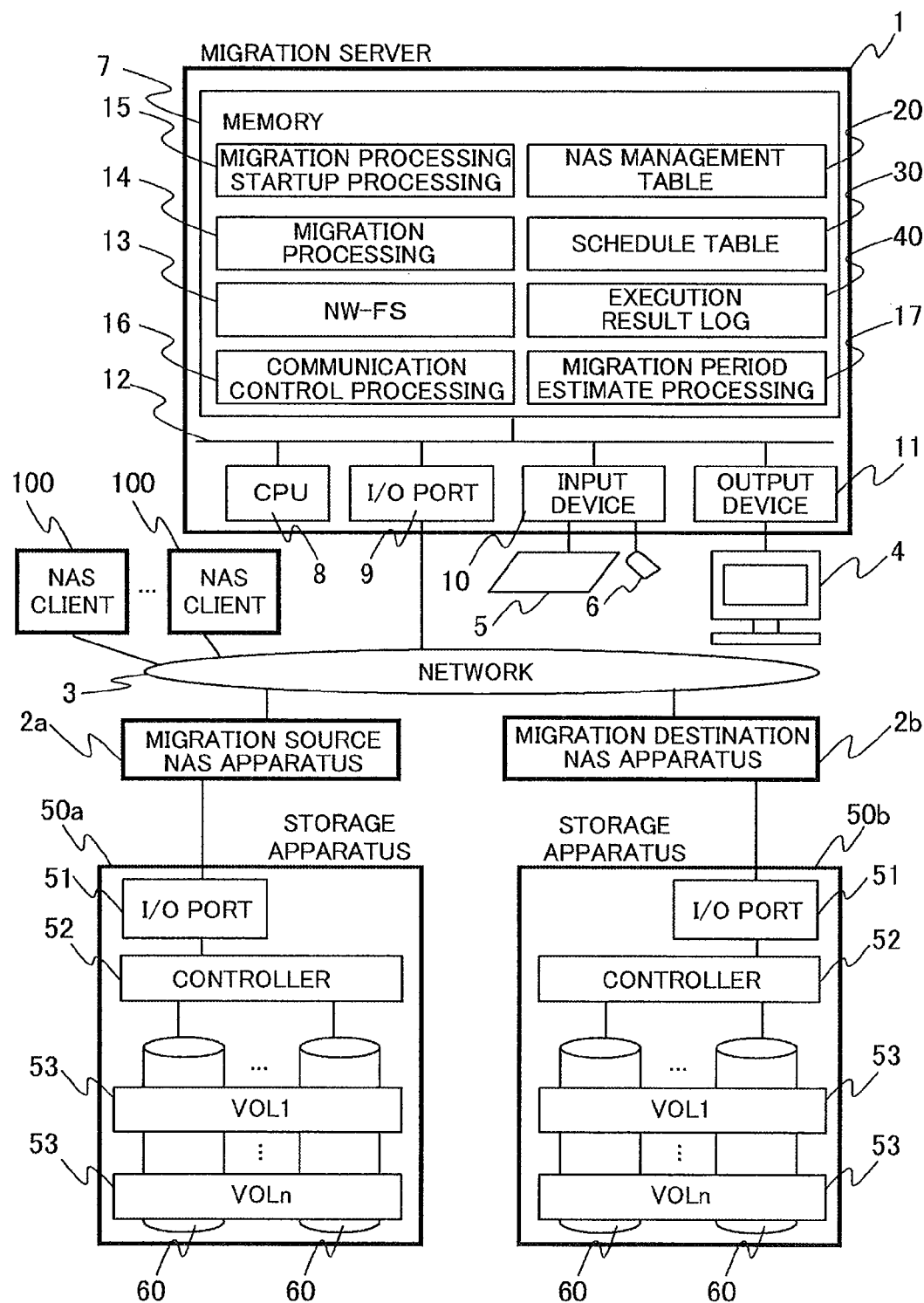
FIG. 1 is a diagram schematically showing the configuration of a storage network system of the first embodiment adopting the NAS apparatus migration method according to the present invention.

FIG. 1 is a configuration example of a system schematically showing a storage network system adopting an embodiment of the present invention.

As shown in FIG. 1, the storage network system of the present embodiment comprises a migration server 1, at least one migration source NAS apparatus 2a, a storage apparatus 50a connected to the migration source NAS apparatus 2a, at least one migration destination NAS apparatus 50b, a storage apparatus 3b connected to the migration destination NAS apparatus 2b, a plurality of NAS clients 100 that implement file access to the migration source NAS apparatus 2a, and a network 3 for connecting the migration server 1 to the copy source NAS apparatus 2a, the copy destination NAS apparatus 2b and the NAS client 100.

The migration server 1 comprises a memory 7, a CPU 8, an I/O port 9 for connecting to the network 3, an input device 10 for connecting a keyboard 5 and a mouse 6, an output device 11 for connecting a display device 4, and an internal bus 12 for connecting the foregoing components 7 to 11. The memory 7 stores a communication control processing program 16 for communicating with the communication protocol of the network 3, a network file system 13 that performs access control to the migration source NAS apparatus 2a and the migration destination NAS apparatus 2b, a migration processing program 14 for implementing the NAS apparatus migration method of the present invention, a migration processing startup processing program 15 for starting up the migration processing program 14, and a migration period estimate processing program 17 for estimating the migration period. The CPU 8 executes these programs. The memory 7 additionally stores a schedule table 30 storing a schedule for the migration processing startup processing program 15 to start up the migration processing program 14, a NAS management table 20 to be used by the migration processing program 14, and an execution result log 40 for outputting the migration result of the migration processing program 14. Although not shown, the memory 7 also stores the operating system.

The storage apparatuses 50a, 50b include at least one I/O port 51 for connecting to the migration source NAS apparatus 2a and the migration destination NAS apparatus 2b, a controller 52 for performing control in the storage apparatus, and at least one disk device 60 configuring at least one volume 53. The volume 53 is a volume for providing a file system to the user of the NAS apparatuses 2a, 2b, and stores files and their attribute information.

The NAS client 100 is a standard personal computer with an operating system running thereon and, although not shown, an application program used by the network file system or NAS for accessing the share directory provided by the NAS apparatus is also running thereon. The NAS client 100 implements file access to the share directory provided by the migration source NAS apparatus 2a until the migration processing from the migration source NAS apparatus 2a to the migration destination NAS apparatus 2b is complete, and, when such migration is complete, it implements file access to the share directory provided by the migration destination NAS apparatus 2b.

Meanwhile, the time required for migrating the NAS apparatus will become longer in proportion to the amount of data stored in the migration source NAS apparatus 2a. In addition, depending on the load on the migration source NAS apparatus 2a caused by the migration processing, the access performance of the NAS client 100 to the migration source NAS apparatus 2a may deteriorate. Thus, the NAS apparatus migration method of the present invention implements migration processing on a daily basis only during the time frame in which the access from the NAS client 100 to the migration source NAS apparatus 2a is low (for instance, only at night). As a result, migration will progress on a daily basis. Nevertheless, as described above, since the NAS client 100 accesses the share directory provided by the migration source NAS apparatus 2a, there are cases where a file that was once migrated is updated. The outline of processing of the NAS apparatus migration method of the present invention to be performed to files that are updated during the migration period is now explained with reference to FIG. 20.

Figure 20:
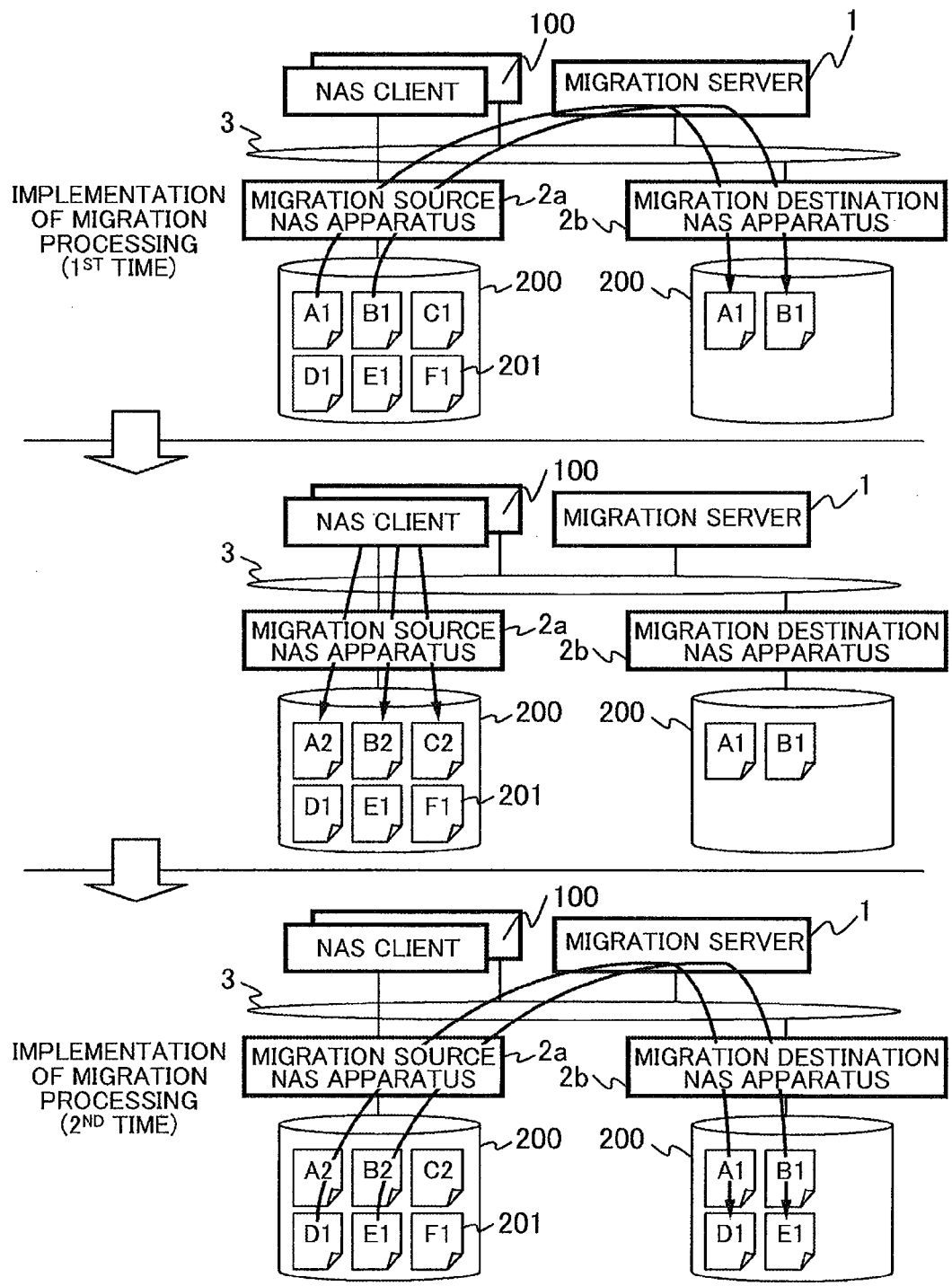
FIG. 20 is a diagram schematically showing a migration routine based on the NAS apparatus migration method according to the present invention.

FIG. 20 is a diagram showing the outline of the migration routine according to the NAS apparatus migration method of the present invention. As described above, the present invention implements migration to the newly installed NAS apparatus while continuing the operation of the existing NAS apparatus in order to avoid deterioration in the write performance. Specifically, the host computer reads and writes files from and into the existing NAS apparatus, and the newly installed NAS apparatus capable of accessing the existing NAS apparatus implements the migration processing. Otherwise, a computer that is capable of accessing the existing NAS apparatus and the newly installed NAS apparatus implements the migration processing. In the foregoing case, since the file write request from the host computer is processed only with the existing NAS apparatus, it is possible to avoid the problem of deterioration in the write performance. Nevertheless, since files of the existing NAS apparatus will be updated, it is necessary to repeatedly perform the migration processing. Here, if numerous files that were once migrated are updated in the existing NAS apparatus, there is a problem in that the numerous updated files must be migrated once again and, during that period, the migration of non-migrated files will not be performed, and the migration processing will not progress.

The example of FIG. 20 shows a measure to be taken against the foregoing problem, and the migration server 1 migrates, during the first migration, files "A1" and "B1" among the files 201 stored in the share directory 200 of the migration source NAS apparatus 2a to the share directory 200 of the migration destination NAS apparatus 2b. After the first migration is complete, the NAS client 100 updates the file "A1," "B1" and "C1" of the share directory 200 of the migration source NAS apparatus 2a, and the foregoing files become files "A2," "B2" and "C2."Subsequently, upon implementing the second migration processing, the migration server 1 does not implement the migration of the files "A2," "B2" and "C2" that were updated after the completion of the first migration processing, and implements the files "D1" and "E1." Thereby, when implementing the migration of the migration source NAS apparatus 2a in which the same files are updated daily, migration of only the updated files on a daily basis can be avoided, and it is thereby possible to perform migration efficiently.

Figures 2, 3, 4:
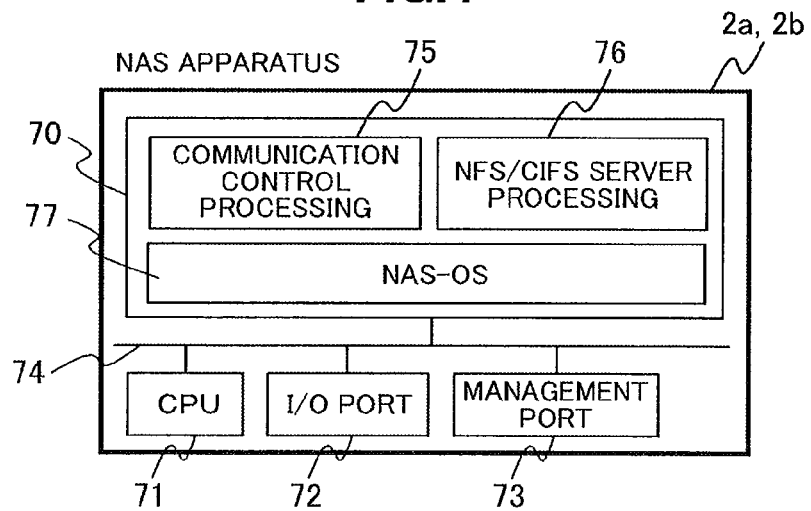
FIG. 2 is a diagram showing an example of a format of a NAS management table.
FIG. 3 is a diagram showing an example of a format of a schedule table according to the first embodiment and the third embodiment.
FIG. 4 is a diagram schematically showing the configuration of a migration source NAS apparatus, and of a migration destination NAS apparatus according to the first embodiment and the second embodiment.

FIG. 2 is a diagram showing the registered contents of the NAS management table 20. As shown in FIG. 2, the NAS management table 20 comprises a field 21 for registering the ID for identifying the registration information, a field 22 for registering the IP address of the migration source NAS apparatus 2a, a field 23 for registering the share directory name to be migrated from the migration source NAS apparatus 2a, a field 24 for registering the IP address of the migration destination NAS apparatus 2b, and a field 25 for registering the share directory name of the migration destination NAS apparatus 2b to which the contents of the share directory of the field 23 are migrated.

For instance, from the entry of the field 21 in which the value is "ID-001," it possible to tell that the contents of the share directory "Share1" of the migration source NAS apparatus 2a having the IP address of "192.168.10.11" will be migrated to the share directory "Share1" of the migration destination NAS apparatus 2b having the IP address of "192.168.10.21."

FIG. 3 shows an example of the registered contents of the schedule table 30. The schedule table 30 registers the schedule for implementing the migration processing based on the entries of the migration source NAS 2a and the migration destination NAS 2b registered in the NAS management table 20. As shown in FIG. 3, the schedule table 30 comprises a field 31 for registering the ID for identifying the pair of the migration source NAS apparatus 2a and the migration destination NAS 2b to be subject to the registered information; that is, the ID registered in the field 21 of the NAS management table 20, a field 32 for registering the date and time for starting the migration processing, a field 33 for registering the date and time for ending the migration processing, and a field 34 for registering the condition of the update date and time of the file to be migrated. If there is no designation in the field 33, this shows that the migration processing will not be ended midway. In other words, migration processing will be implemented until the migration of all files is complete. Moreover, if the value of the field 34 is "0," this shows that the file will be migrated regardless of the update date and time of such file.

For instance, with the first entry of FIG. 3, the value of the field 31 is "ID-001," and, from the entry in which the value of the field 21 of the NAS management table 21 is "ID-001," it is possible to tell that this is a schedule for migrating the contents of the share directory "Share1" of the migration source NAS apparatus 2a having an IP address of "192.168.10.11" to the share directory "Share1" of the migration destination NAS apparatus 2b having an IP address of "192.168.10.21," migration will start at 20:00 on Jan. 2, 2008 and migration will end at 7:00 on Jan. 3, 2008. In addition, it is also possible to tell that files that are not updated within 24 hours will not be migrated.

The fifth entry of FIG. 3 has no designation in the field 33; that is, there is no designation regarding the migration end date and time. In this case, it is possible to tell that the migration processing will not be ended until the migration processing of all files is complete. In addition, the value of the field 34 is "0," and it is possible to tell that the migration of files is terminated by migration all files regardless of the update date and time of such files.

FIG. 4 is a diagram schematically showing a configuration example of the migration source NAS apparatus 2a and the migration destination NAS apparatus 2b. As shown in FIG. 4, the NAS apparatuses 2a, 2b comprise a memory 70, a CPU 71, at least one I/O port 72 for connecting to the storage apparatuses 50a, 50b, a management port 73, and an internal bus 74 for connecting the foregoing components 70 to 73. The memory 70 stores a communication control processing program 75 for communicating with a communication protocol of the network 3, an NFS/CIFS server processing program 76 that provides a function for the host computer to access the volumes provided by the NAS apparatuses 2a, 2b, and a NAS-OS 77 for implementing processing according to the contents read from and written into the files that the NFS/CIFS server processing program 76 received from the host computer. The CPU 71 executes these programs.

Figure 5:
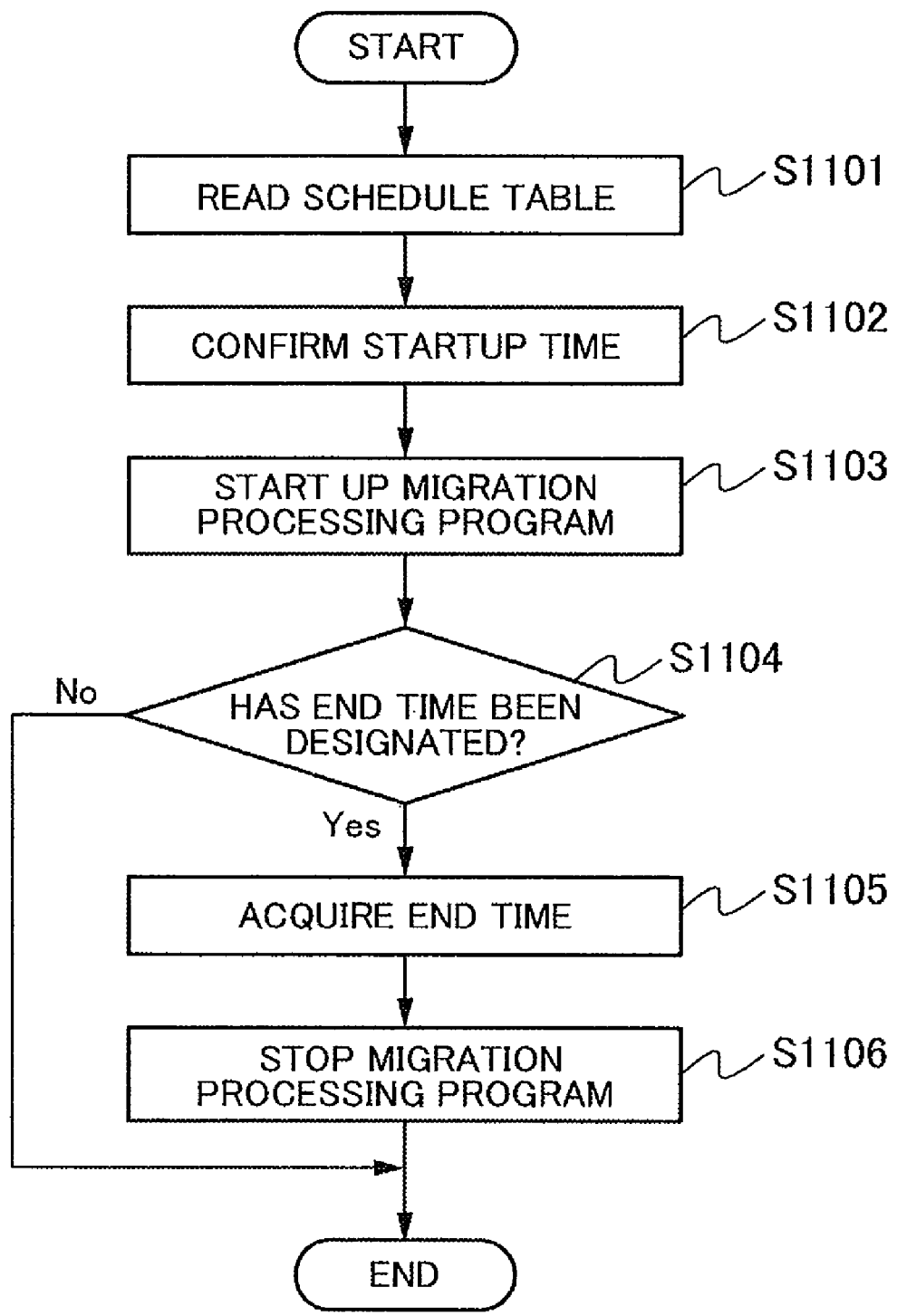
FIG. 5 is a processing flow of a migration processing startup processing program.

The processing routine of the migration processing startup processing program 15 is now explained with reference to FIG. 5. FIG. 5 shows the processing flow of the migration processing startup processing program 15.

The migration processing startup processing program 15 reads the schedule table 30 at S1101, confirms the start date and time of the migration processing program 14 from the field 31 of the schedule table 30 at S1102, and starts up the migration processing program 14 at the confirmed start date and time (S1103). Here, the IP address of the migration source NAS apparatus 2a and the migration destination NAS 2b acquired from the NAS management table 20, the share directory name, and the value of the field 34 of the schedule table 30 are designated as the startup parameter of the migration processing program.

Subsequently, [the migration processing startup processing program 15] confirms whether the end date and time of the migration processing program 14 has been set in the field 33 of the schedule table 30 at S1104, ends the processing if the end date and time has not been set, and proceeds to S1105 if the end date and time has been set. At S1105, the migration processing startup processing program 15 acquires the end date and time set in the field 33 of the schedule table 30, stops migration processing program 14 at the acquired end date and time (S1105), and then ends the processing.

Incidentally, the processing from S1102 to S1105 is executed in parallel for each entry registered in the schedule table 30.

The processing routine of the migration processing program 14 in this embodiment is now explained with reference to FIG. 6 to FIG. 10.

Figure 6:
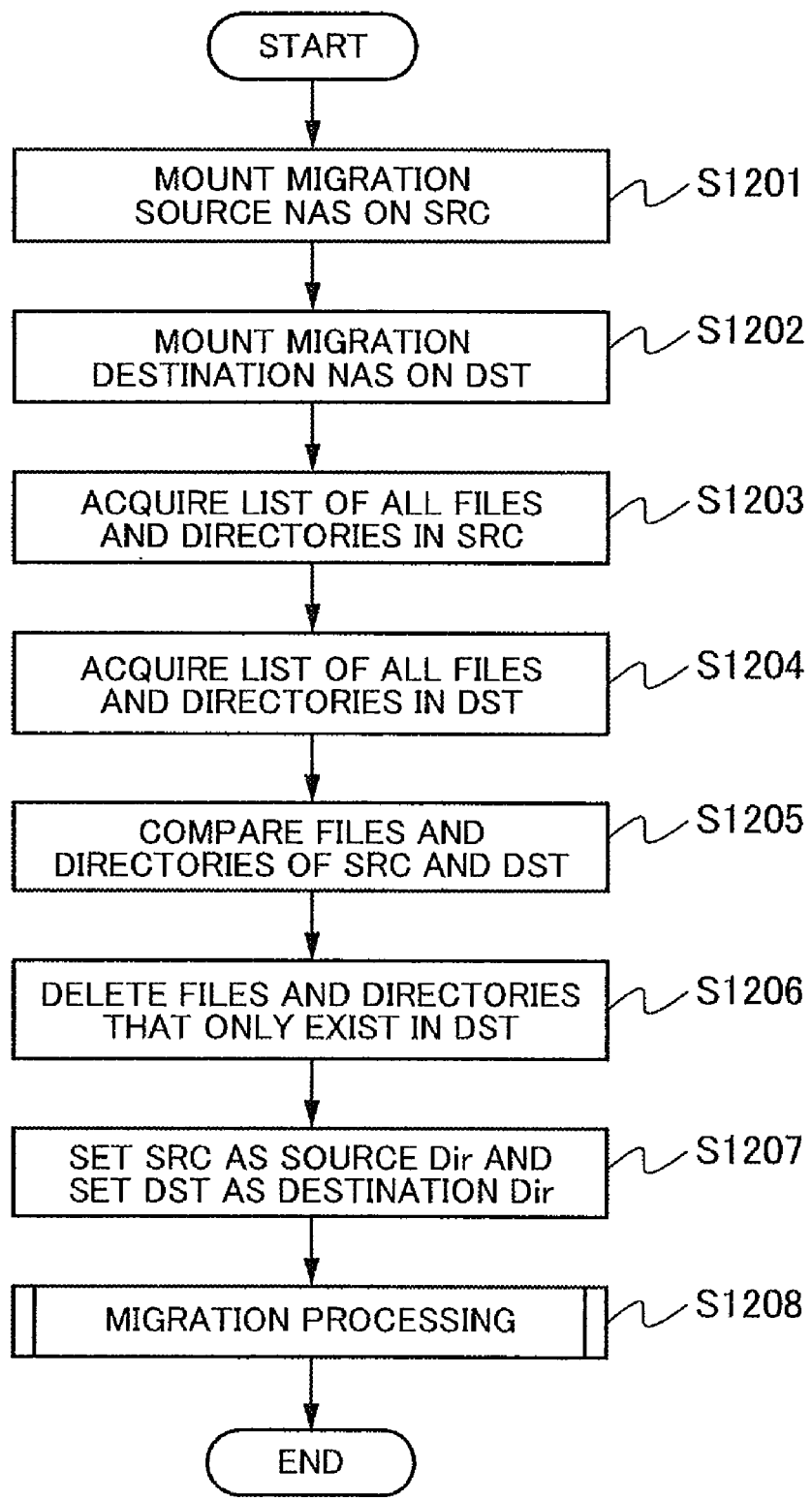
FIG. 6 is a processing flow of the migration processing program according to the first embodiment and the third embodiment deleting files from the migration destination NAS apparatus which do not exist in the migration source NAS apparatus.

FIG. 6 is a processing flow showing the processing routine where, as the preprocessing of the migration processing, the migration processing program 14 deletes files, which were deleted from the migration source NAS apparatus 2a and exist only in the migration destination NAS apparatus 2b, from the migration destination NAS 2b.

Foremost, the migration processing program 14, at S1201, mounts a share directory of the migration source NAS apparatus 2a designated by the migration processing startup processing program 15 with a certain directory (hereinafter simply referred to as "SRC") of the migration server 1 as the mount point, and at S1202, mounts a share directory of the migration destination NAS apparatus 2b designated by the migration processing startup processing program 15 with a different directory (hereinafter simply referred to as "DST") of the migration server 1 as the mount point. Subsequently, the migration processing program 14 acquires a list of files and directories in "SRC" at S1203, and acquires a list of files and directories in "DST" at S1204. At S1205, the migration processing program 14 compares the list of files and directories acquired at S1203 and S1204, and deletes from "DST" the files and directories only existing in "DST" at S1206. Subsequently, at S1207, the migration processing program 14 sets "SRC" as "source Dir" and sets "DST" as "destination Dir," and thereafter implements migration processing at S1208. Details concerning the migration processing will be explained with reference to FIG. 7. Although the list of directories (including at least the file name and update time of each file) acquired at S1203 and S1204 may be temporarily or permanently stored in one of the apparatuses of the information system, it is preferably stored in the migration server.

Figure 7:
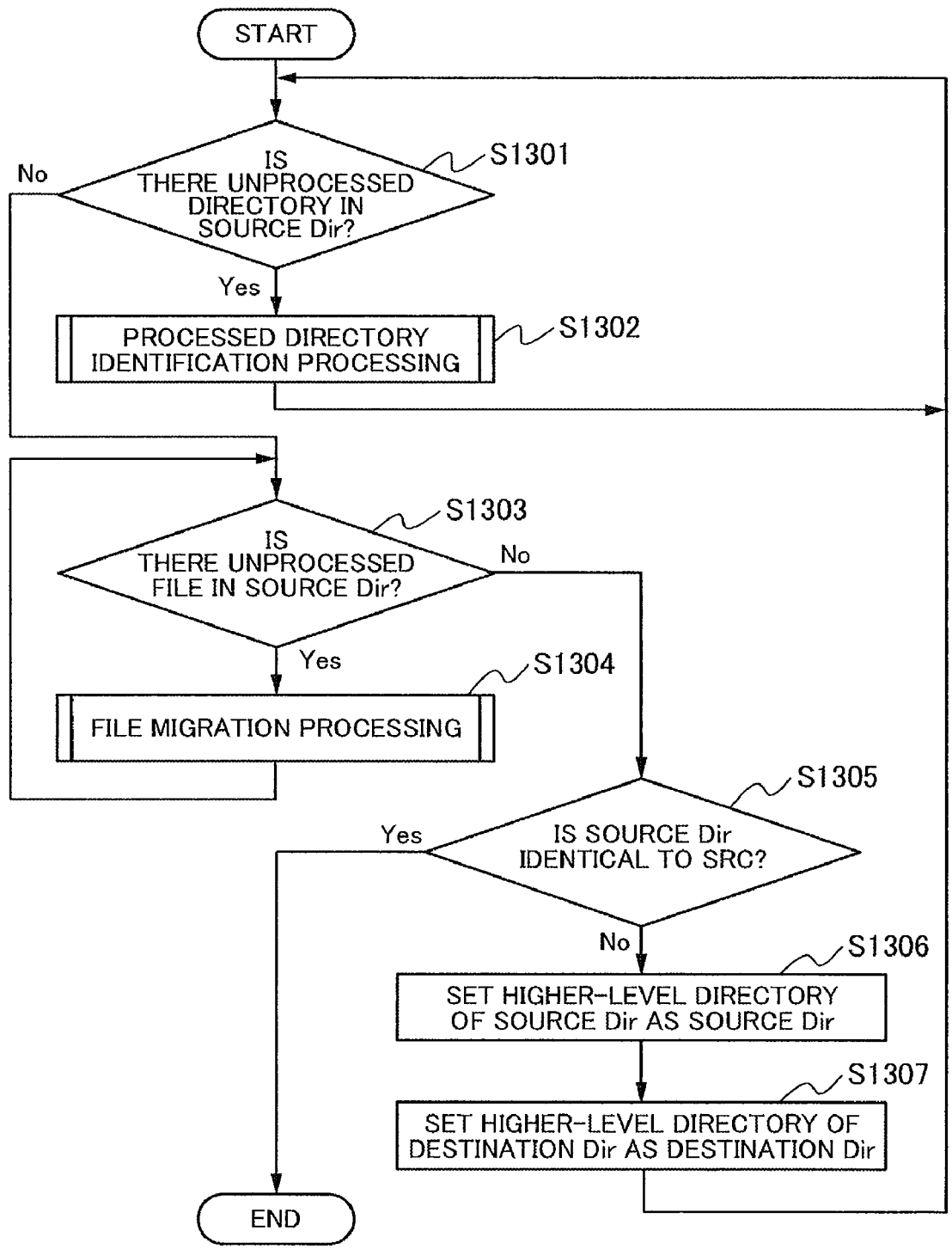
FIG. 7 is a processing flow of the migration processing program according to the first embodiment and the third embodiment for migrating from the migration source NAS apparatus to the migration destination NAS apparatus.

FIG. 7 is a processing flow showing the processing routine where the migration processing program 14 of this embodiment migrates the files stored in the file system of the migration source NAS apparatus 2a to the file system of the migration destination NAS apparatus 2b. In this flow, recursive processing is performed by sequentially changing the foregoing values with the values of "source Dir" and "destination Dir" set at S1207 of FIG. 6 as the top directory.

Foremost, the migration processing program 14, at S1301, confirms whether there is a directory in the "source Dir" which was not previously subject to the processing of S1302 (this directory is hereinafter sometimes referred to as an "unprocessed directory"). If there is a directory that was not subject to the processing of S1302 as a result of the confirmation at S1301, the migration processing program 14 designates that directory and implements S1302, and proceeds to S1303 if there is no directory that was not subject to the processing of S1302.

Figure 8:
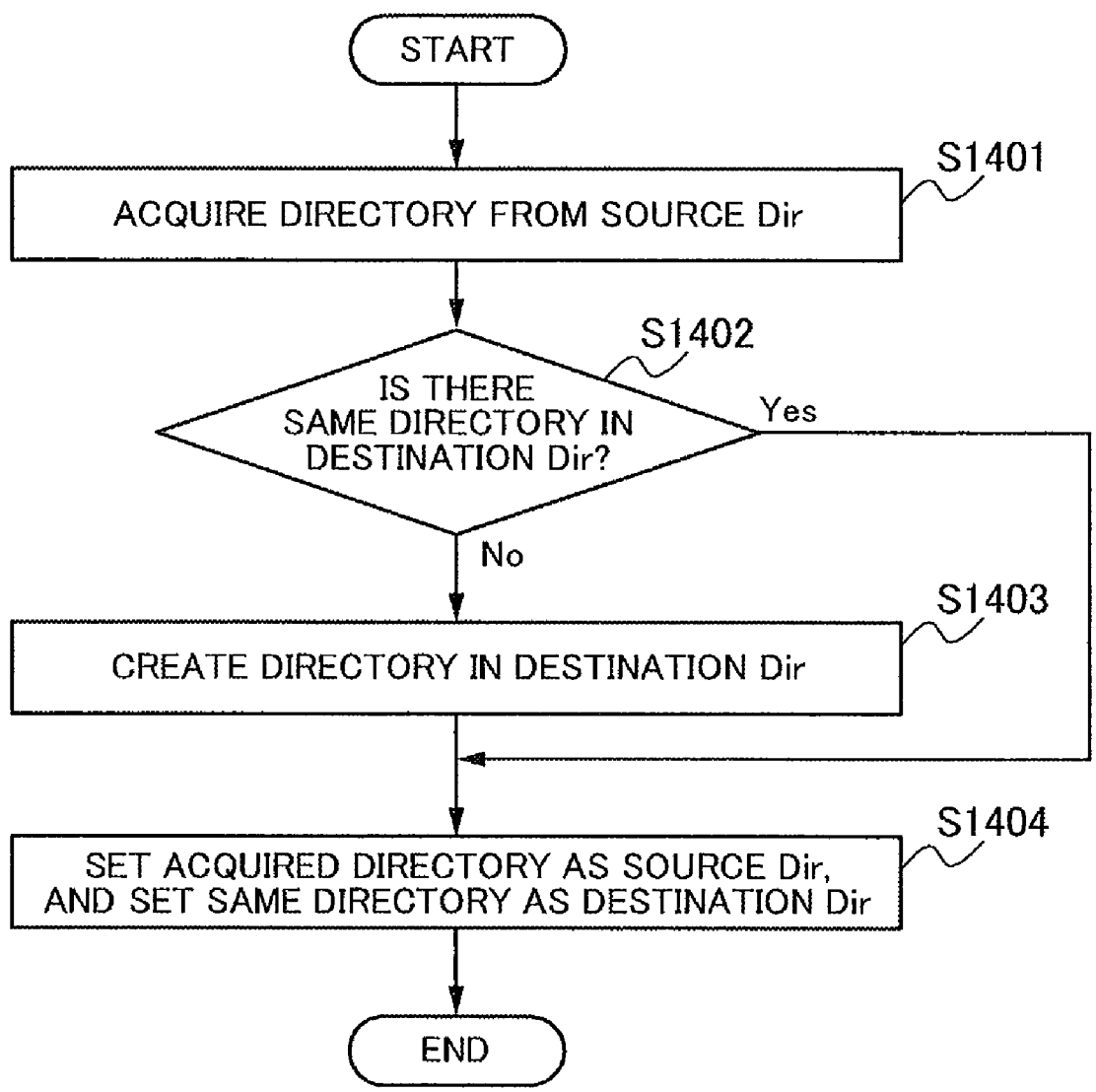
FIG. 8 is a processing flow of the migration processing program according to the first embodiment and the third embodiment migrating directories from the migration source NAS apparatus to the migration destination NAS apparatus.

At S1302, the migration processing program 14 creates a directory, which exists in "source Dir" but does not exist in "destination Dir," in "destination Dir" and changes the directory to be processed; that is, changes "source Dir" and "destination Dir." Details of this processing will be explained with reference to FIG. 8. After changing "source Dir" and "destination Dir" at S1302, the migration processing program 14 performs the processing of S1301 to the changed "source Dir" and "destination Dir."

At S1303, the migration processing program 14 confirms whether there is a file in "source Dir" which was not subject to the migration processing of S1304 after being previously created or updated (this kind of file is hereinafter sometimes referred to as an "unprocessed file"). If there is a file that was not subject to the processing of S1304 as a result of the confirmation at S1303, the migration processing program 14 designates that file and implements S1304, and proceeds to S1305 if there is no file that was not subject to the processing of S1304.

At S1304, the migration processing program 14 migrates the file from "source Dir" to "destination Dir," and then proceeds to S1303. Details regarding the processing at S1304 will be explained later with reference to FIG. 9.

At S1305, the migration processing program 14 confirms whether "source Dir" and "SRC" are the same directory. If "source Dir" and "SRC" are the same directory as a result of the confirmation at S1305, the migration processing program 14 ends the processing. Meanwhile, if "source Dir" and "SRC" are different directories, the migration processing program 14 implements S1306 and S1307, and thereafter proceeds to S1301.

At S1306, the higher-level directory of "source Dir" is set as "source Dir." For instance, if "source Dir" is "/aaa/bbb/ccc," "source Dir" is set as "/aaa/bbb." At S1307, the higher-level directory of "destination Dir" is set as "destination Dir."

As a result of the foregoing processing, migration of directories and files in the directory of the migration source NAS apparatus 2a to the share directory of the migration destination NAS apparatus 2b is complete.

The processing at S1302 of FIG. 7 is now explained in detail with reference to FIG. 8. FIG. 8 is a processing flow for the migration processing program 14 of this embodiment to create a directory existing in "source Dir," which is designated upon implementing S1302 of FIG. 7, in "destination Dir."

The migration processing program 14, at S1401, acquires the designated directory from "source Dir." Subsequently, at S1402, the migration processing program 14 confirms whether the designated directory exists in "destination Dir," and proceeds to S1404 if the designated directory exists in "destination Dir." Meanwhile, if the designated directory does not exist in "destination Dir," the migration processing program 14, at S1403, creates that directory in "destination Dir" and then proceeds to S1404. At S1404, the migration processing program 14 sets the directory acquired at S1401 as "source Dir," and sets a directory of "destination Dir" that is identical to that directory as "destination Dir."

Figure 9:
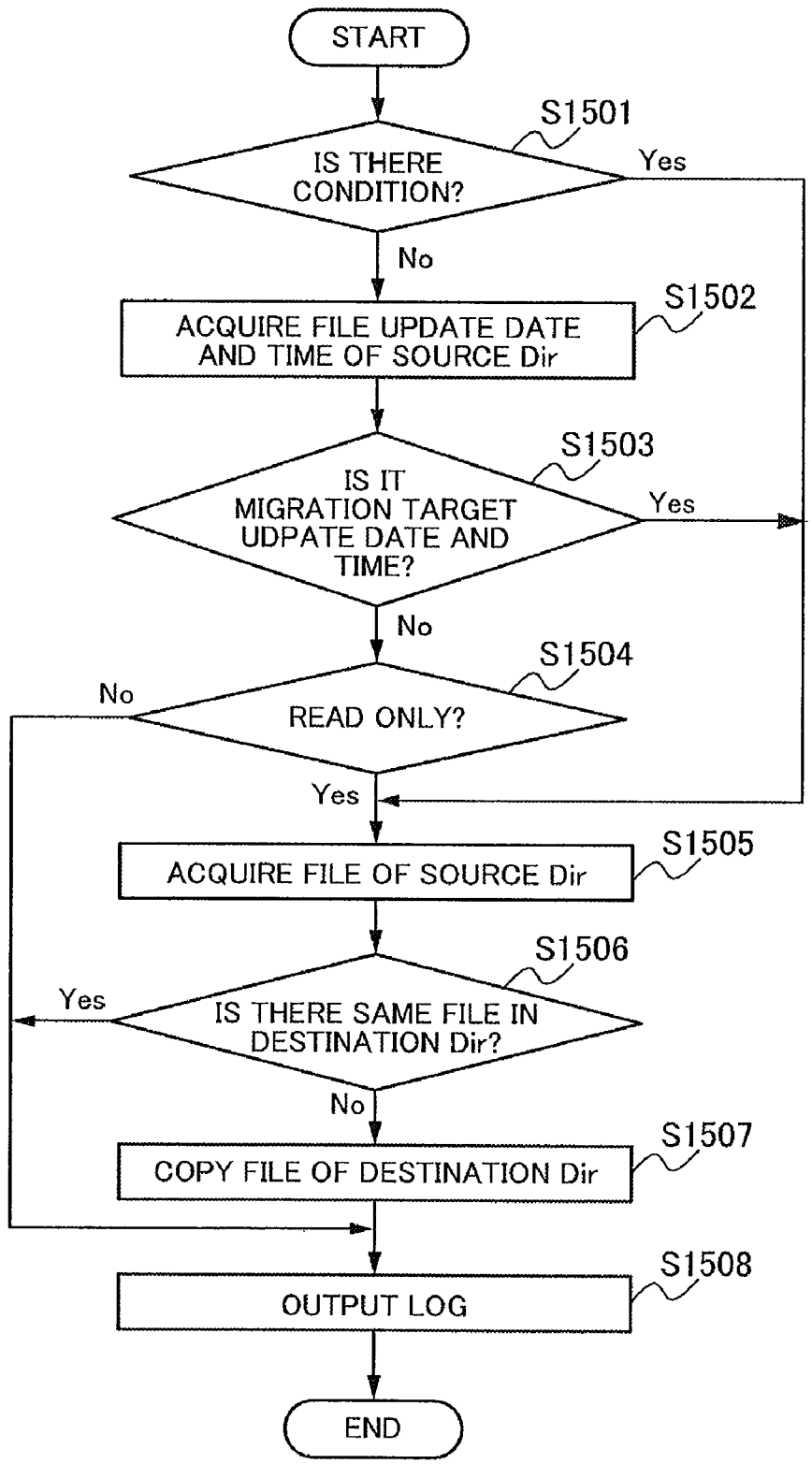
FIG. 9 is a processing flow of the migration processing program according to the first embodiment and the third embodiment migrating files from the migration source NAS apparatus to the migration destination NAS apparatus.

Details regarding the processing at S1304 of FIG. 7 are now explained with reference to FIG. 9. FIG. 9 is a processing flow for the migration processing program 14 of this embodiment to migrate the files existing in "source Dir," which is designated upon implementing S1304 of FIG. 7, to "destination Dir."

The migration processing program 14, at S1501, confirms whether the value of the field 34 of the schedule table 30 designated by the migration processing startup processing program 15 is "0," and proceeds to S1505 of such value is "0." Meanwhile, if the value is other than "0," the migration processing program 14 proceeds to S1502.

At S1502, the migration processing program 14 acquires the update date and time of the designated file. Subsequently, at S1503, the migration processing program 14 confirms whether the update date and time of the designated file satisfies the value of the field 34 of the schedule table 30; that is, the condition of the update date and time of the migration-target file designated by the migration processing startup processing program 15 during the startup of the migration processing program 14. For example, if the migration processing program 14 was started up according to the schedule of the first entry of the schedule table 30, the migration processing program 14 confirms whether an update has occurred before "20:00 on Jan. 1, 2008" obtained by subtracting "24 hours," which is the value of the field 34, from "20:00 on Jan. 2, 2008" as the migration start date and time regarding the designated file.

The migration processing program 14 proceeds to S1505 if the designated file satisfies a prescribed condition defined in the schedule table 30 or defined by a user as a result of S1503, and proceeds to S1504 if the designated file does not satisfy the prescribed condition.

At S1504, the migration processing program 14 confirms whether the file in which the update date and time was confirmed is a non-modifiable file; that is, whether it is a so-called WORM (Write Only Read Many) file. If the file is a WORM file as a result of S1504, the migration processing program 14 proceeds to S1505. Meanwhile, if the file is not a WORM file, at S1508, the migration processing program 14 outputs a message to the execution result log 40 to the effect that the designated file has been excluded from migration, and then ends the processing. Incidentally, WORM is a function that is used for guaranteeing that the digital file submitted to the court or in an audit has not been updated. As one method of realizing WORM, the NAS apparatus denies the update or deletion request of a file once set with WORM issued by a user of the NAS client or the NAS apparatus, and also denies permanently or for a predetermined period of time a cancellation request of the WORM setting from the user of the NAS client or the NAS apparatus. In addition, WORM can also be realized by guaranteeing that the foregoing modification or deletion will not be carried out for at least a given period of time.

At S1505, the migration processing program 14 acquires a file and the attribute information and time stamp of such file from "source Dir," and temporarily stores these in the memory 7. Subsequently, at S1506, the migration processing program 14 confirms whether a file that is identical to the file stored in the memory 7 at S1505 exists in "destination Dir." Here, whether the attribute information and time stamp of the file are identical is also confirmed. If the same file exists in "destination Dir" as a result of S1506, the migration processing program 14, at S1508, outputs the designated file and a message to the effect that the same file exists in "destination Dir" to the execution result log 40, and then ends the processing. A log showing that the same file exists may or may not be output.

If a same file does not exist in "destination Dir" as a result of S1506, the migration processing program 14, at S1507, copies the file temporarily stored in the memory 7 to "destination Dir." Here, the attribute information (system file attribute, read-only attribute, encryption attribute, WORM attribute, etc.) and the time stamp (created date and time, update date and time, last access date and time) of the file are also copied, and the file and the attribute information and time stamp of that file are deleted from the memory 7. At S1508, the migration processing program 14 outputs a message to the effect that the file has been copied to "destination Dir" to the execution result log 40, and then ends the processing. Although the copying performed at S1506 may initially target all file data, if the same file has already been copied to the migration destination NAS apparatus 2b, a part of the file data including the changes may be copied.

After completing the migration of all files from the migration source NAS apparatus 2a to the migration destination NAS apparatus 2b based on the foregoing processing, by setting the IP address of the migration source NAS apparatus 2a to the migration destination NAS apparatus 2b, operation with the migration destination NAS apparatus 2b can be started without having to change the setting of the NAS client 100.

FIG. 10 shows an example of the execution result log 40. Output to the execution result log 40 are the status showing whether the migration processing program 14 copied the file based on the migration result of the file existing in the share directory of the migration source NAS apparatus 2a (Copied), excluded the file because the update date and time of the file did not satisfy a prescribed condition (Excluded), or skipped the file since the same file exists in the share directory of the migration destination NAS apparatus 2b (Same), and the file name and file size of the target file. In addition, if the status is "Copied," the time required for the copying process is output as the copying time.

For example, FIG. 10 shows that the file "/dir1/file1" has a file size of "1,024," was copied, and the copying time was "2" hours. FIG. 10 also shows that the file "/dir1/file3" has a file size of "2,048" and was excluded from migration.

Figure 11:
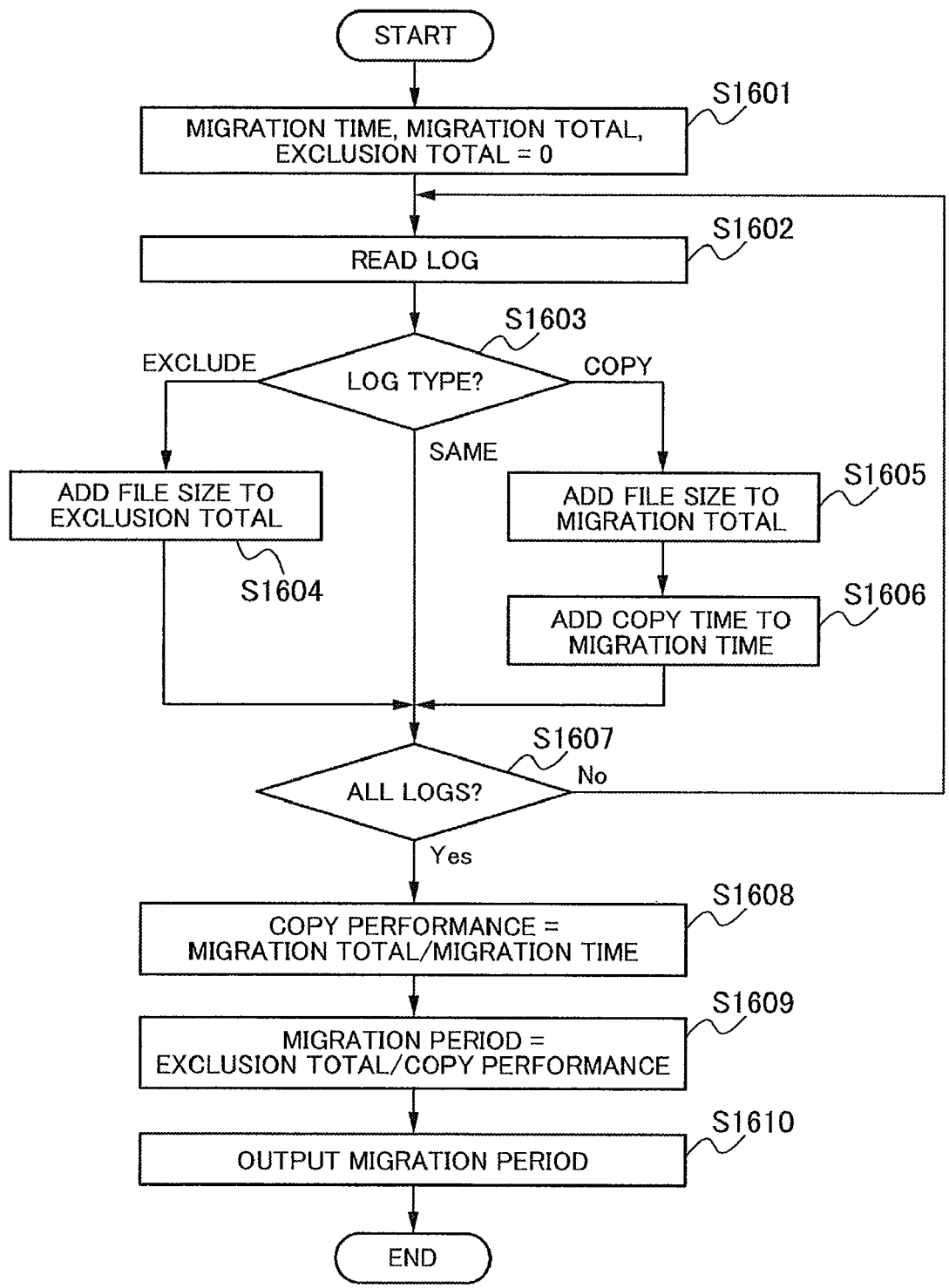
FIG. 11 is a processing flow of a migration period estimate processing program according to the first embodiment and the third embodiment.

The processing routine of the migration period estimate processing program 17 is now explained with reference to FIG. 11. FIG. 11 is a processing flow for the migration period estimate processing program 17 to estimate the time required for migrating the non-migrated files based on the contents of the execution result log 40.

Foremost, the migration period estimate processing program 17, at S1601, sets the "migration time," "migration total," and "exclusion total" to "0," and acquires one log from the execution result log 40 at S1602. Subsequently, at S1603, the migration period estimate processing program 17 confirms the type of log, or the status of the log. If the status of the log is "Same" as a result of S1603, the migration period estimate processing program 17 proceeds to S1607. If the status of the log is "Excluded" as a result of S1603, the migration period estimate processing program 17, at S1604, adds the value of the file size of the log to the "exclusion total," and then proceeds to S1607. If the status of the log is "Copied" as a result of S1603, the migration period estimate processing program 17, adds the value of the file size of the log to the "migration total" at S1605, adds the value of the copying time of the log to the "migration time" at S1606, and then proceeds to S1607.

At S1607, the migration period estimate processing program 17 confirms whether the processing was performed to all logs of the execution result log 40, and proceeds to S1608 if the processing was performed to all logs. Meanwhile, if the processing was not performed to all logs, the migration period estimate processing program 17 proceeds to S1602, and performs the processing to the subsequent log.

At S1608, the migration period estimate processing program 17 sets a value obtained by dividing the value of "migration total" by the value of "migration time" as the "copy performance." Subsequently, at S1609, the migration period estimate processing program 17 sets a value obtained by dividing the value of "exclusion total" by the value of "copy performance" as the "migration period." Finally, at S1610, the migration period estimate processing program 17 outputs the values of "copy performance," "migration period" and "exclusion total" to the display device 4.

In the first embodiment of the NAS apparatus migration method according to the present invention, the migration server 1 migrates files, other than the files that were updated from a certain specific date and time to the migration start date and time among the files stored in the share directory of the migration source NAS apparatus 2a, to the share directory of the migration destination NAS apparatus 2b. Thus, when repeatedly migrating the NAS apparatus on a daily basis based on the migration method of the present invention in a state of continuing the operation of the migration source NAS apparatus 2a, the files that are updated daily can be excluded from the migration target, and there is a particular effect of being able to quicken the migration progress if there is locality in the files to be updated by the NAS client. Moreover, the migration performance is calculated based on the file size of the migrated file and the time required for the migration, and the time required for migrating the non-migrated files is calculated based on the file size of the non-migrated files and the migration performance. Thus, it is possible to estimate the time required to migrate the non-migrated files (files excluded from migration). Further, since migration processing is implemented while continuing the operation of the migration source NAS apparatus, the latest files will constantly be stored in the migration source NAS apparatus. Thus, the operation of the migration source NAS apparatus can be easily resumed even if the migration processing is unsuccessful due to a failure or the like.

Second Embodiment

The second embodiment of the present invention is now explained with reference to FIG. 12 to FIG. 16. Explanation regarding the subject matter that is common with the first embodiment is omitted.

Figure 12:
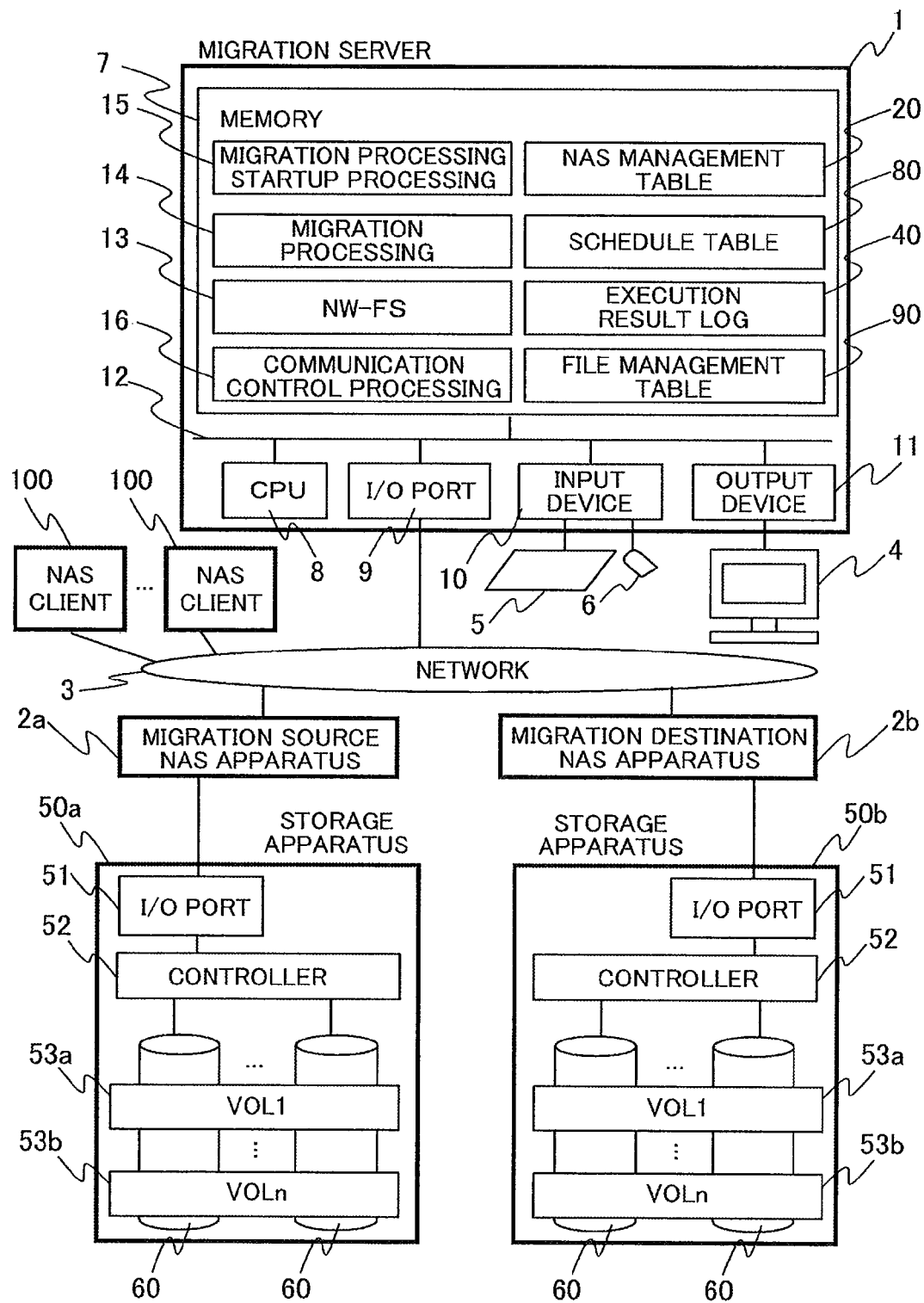
FIG. 12 is a diagram schematically showing the configuration of a storage network system of the second embodiment adopting the NAS apparatus migration method according to the present invention.

FIG. 12 is a configuration example of a system schematically showing a storage network system adopting the second embodiment of the present invention.

As shown in FIG. 12, the storage network system of this embodiment comprises a migration server 1, at least one migration source NAS apparatus 2a, a storage apparatus 50a connected to the migration source NAS apparatus 2a, at least one migration destination NAS apparatus 50b, a storage apparatus 3b connected to the migration destination NAS apparatus 2b, a plurality of NAS clients 100 for performing file access to the migration source NAS apparatus 2a, and a network 3 for connecting the migration server 1 to the copy source NAS apparatus 2a, the copy destination NAS apparatus 2b and the NAS client 100.

The migration server 1 comprises a memory 7, a CPU 8, an I/O port 9 for connecting to the network 3, an input device 10 for connecting a keyboard 5 and a mouse 6, an output device 10 for connecting a display device 4, and an internal bus 12 for connecting the foregoing components 7 to 11. The memory 7 stores a communication control processing program 16 for communicating with the communication protocol of the network 3, a network file system 13 that performs access control to the migration source NAS apparatus 2a and the migration destination NAS apparatus 2b, a migration processing program 14 for implementing the NAS apparatus migration method of the present invention, and a migration processing startup processing program 15 for starting up the migration processing program 14. The CPU 8 executes these programs. The memory 7 additionally stores a schedule table 80 storing a schedule for the migration processing startup processing program 15 to start up the migration processing program 14, a NAS management table 20 to be used by the migration processing program 14, an execution result log 40 for outputting the migration result of the migration processing program 14, and a file management table 90 storing a list of files stored in the share directory of the migration source NAS apparatus 2a. Although not shown, the memory 7 also stores the operating system.

The storage apparatuses 50a, 50b include at least one I/O port 51 for connecting to the migration source NAS apparatus 2a and the migration destination NAS apparatus 2b, a controller 52 for performing control in the storage apparatus, and at least one disk device 60 configuring at least one volume 53. The volume 53 is a volume for providing a file system to the user of the NAS apparatuses 2a, 2b, and stores files and their attribute information.

Figures 13, 14:
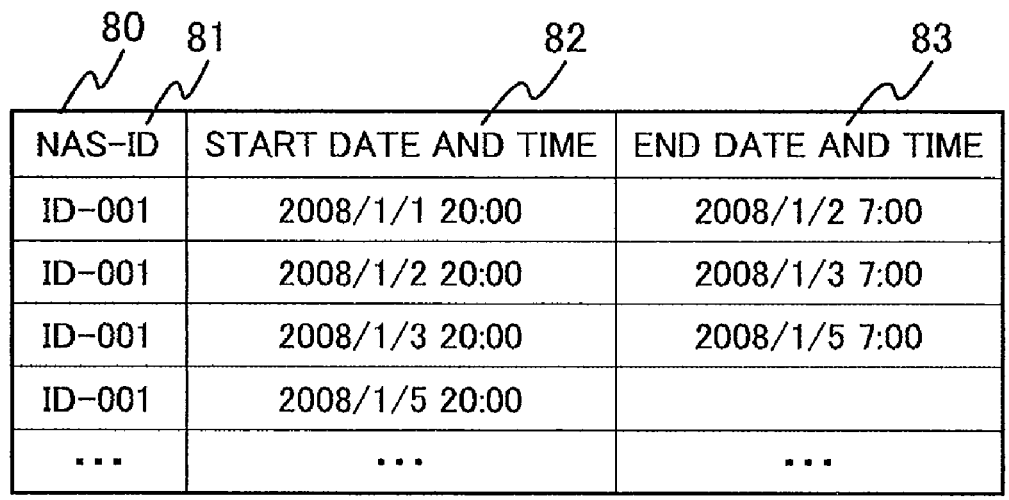
FIG. 13 is a diagram showing an example of a schedule table according to the second embodiment and the fourth embodiment.
FIG. 14 is a diagram showing an example of a file management table.

FIG. 13 shows an example of the registered contents of the schedule table 80. The schedule table 80 registers the schedule for implementing the migration processing based on the entries of the migration source NAS 2a and the migration destination NAS 2b registered in the NAS management table 20. As shown in FIG. 13, the schedule table 80 comprises a field 81 for registering the ID for identifying the pair of the migration source NAS apparatus 2a and the migration destination NAS 2b to be subject to the registered information; that is, the ID registered in the field 21 of the NAS management table 20, a field 82 for registering the date and time for starting the migration processing, and a field 83 for registering the date and time for ending the migration processing. If there is no designation in the field 83, this shows that the migration processing will not be ended midway. In other words, migration processing will be implemented until the migration of all files is complete (i.e., until the file migration is terminated).

For instance, with the first entry of FIG. 13, the value of the field 81 is "ID-001," and, from the entry in which the value of the field 21 of the NAS management table 21 is "ID-001," it is possible to tell that this is a schedule for migrating the contents of the share directory "Share1" of the migration source NAS apparatus 2a having an IP address of "192.168.10.11" to the share directory "Share1" of the migration destination NAS apparatus 2b having an IP address of "192.168.10.21," migration will start at 20:00 on Jan. 2, 2008 and migration will end at 7:00 on Jan. 3, 2008. Since the fourth entry of FIG. 13 has no designation in the field 83, it is possible to tell that the migration processing will not be ended until the migration processing of all files is complete.

FIG. 14 is a diagram showing an example of the registered contents of the file management table 90. The files stored in the share directory of the migration source NAS apparatus 2a are registered in the file management table 90 in chronological order of the update date and time. In the example of FIG. 14, "/dir1/file2" has the oldest update date and time, and "/dir1/dir2/dir3/file1" is the second oldest file.

The processing routine of the migration processing program 14 in this embodiment is now explained with reference to FIG. 15 and FIG. 16. Incidentally, since the processing routine of the migration processing startup processing program 15 for starting up the migration processing program 14 is the same as the first embodiment, the explanation thereof is omitted.

Figure 15:
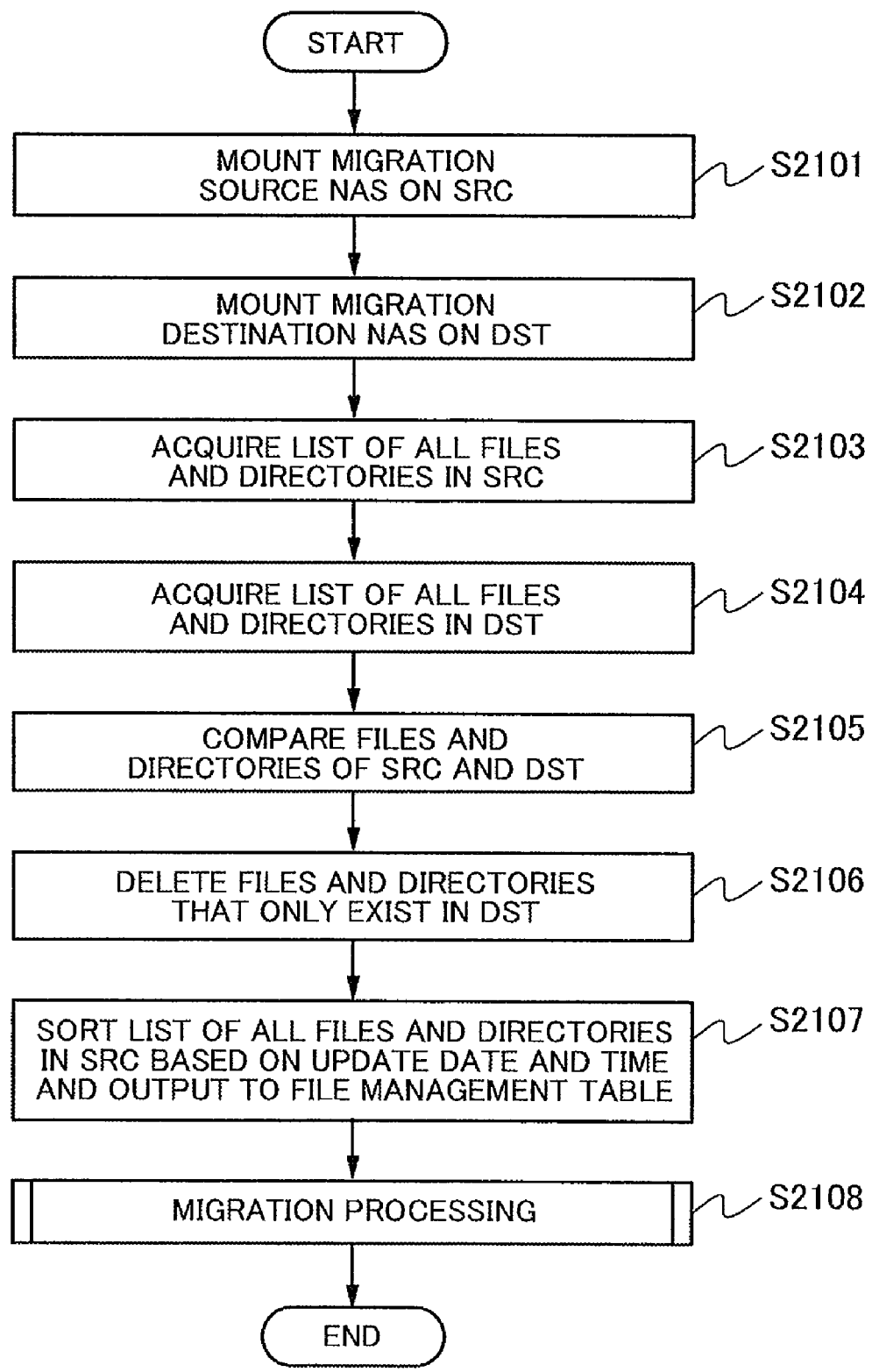
FIG. 15 is a processing flow of the migration processing program according to the second embodiment and the fourth embodiment deleting files from the migration destination NAS apparatus that do not exist in the migration source NAS apparatus.

FIG. 15 is a processing flow showing the processing routine where, as the preprocessing of the migration processing, the migration processing program 14 deletes files, which were deleted from the migration source NAS apparatus 2a and exist only in the migration destination NAS apparatus 2b, from the migration destination NAS 2b, and creates a file management table. Foremost, the migration processing program 14, at S2101, mounts a share directory of the migration source NAS apparatus 2a designated by the migration processing startup processing program 15 on "SRC," and at S2102, mounts a share directory of the migration destination NAS apparatus 2b designated by the migration processing startup processing program 15 on "DST." Subsequently, the migration processing program 14 acquires a list of files and directories in "SRC" at S2103, and acquires a list of files and directories in "DST" at S2104. At S2105, the migration processing program 14 compares the list of files and directories acquired at S2103 and S2104, and deletes from "DST" the files and directories only existing in "DST" at S2106. Subsequently, at S2107, the migration processing program 14 sorts the contents of the list of files and directories in "SRC" in chronological order of the update date and time, outputs the sorted contents to the file management table 90, and thereafter implements the migration processing at S2108. Details regarding the migration processing will be explained with reference to FIG. 16.

Figure 16:
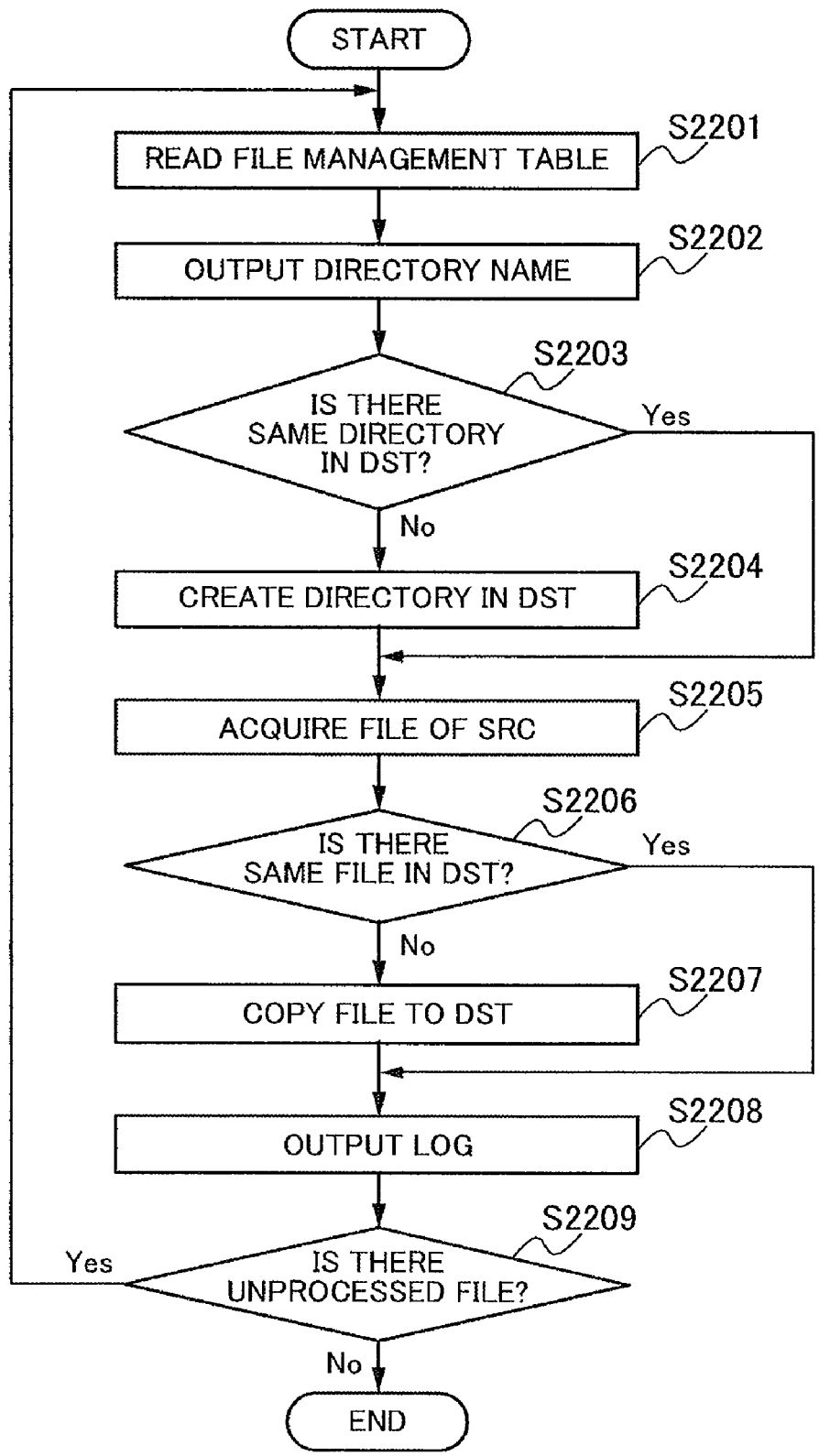
FIG. 16 is a processing flow of the migration processing program according to the second embodiment and the fourth embodiment for migrating from the migration source NAS apparatus to the migration destination NAS apparatus.

FIG. 16 is a processing flow showing the processing routine for the migration processing program 14 of this embodiment to migrate the files stored in the file system of the migration source NAS apparatus 2a to the file system of the migration destination NAS apparatus 2b.

Foremost, the migration processing program 14, at S2201, acquires the file name from the file management table 90, and, at S2202, extracts the directory name from the file name acquired at S2201. Subsequently, at S2203, the migration processing program 14 confirms whether the directory of the directory name extracted at S2202 exists in "DST." If the directory exists in "DST" as a result of S2202, the migration processing program 14 proceeds to S2205. Meanwhile, if the directory does not exist in "DST," the migration processing program 14, at S2204, creates the directory of the directory name extracted at S2202 in "DST," and thereafter proceeds to S2205.

At S2205, the migration processing program 14 acquires the file of the file name acquired at S2201 and the attribute information and time stamp of such file, and temporarily stores these in the memory 7. Subsequently, at S2206, the migration processing program 14 confirms whether the same file as the file stored in the memory 7 at S2205 exists in "DST." Here, whether the attribute information and time stamp of the file are the same is also confirmed. If the same file exists in "DST" as a result of the confirmation at S2206, the migration processing program 14, at S2208, outputs a message to the effect that the same file exists in "DST" to the execution result log 40, and then proceeds to S2209.

If the same file does not exist in "DST" as a result of the confirmation at S2206, the migration processing program 14, at S2207, copies the file that was temporarily stored in the memory 7 at S2205 to "DST," and deletes the file and the attribute information and time stamp of such file from the memory 7. Here, the attribute and time stamp of the file are also copied. At S2208, the migration processing program 14 outputs a message to the effect that the file has been migrated to the execution result log 40, and then proceeds to S2209.

At S2209, the migration processing program 14 confirms whether there is an unprocessed file name in the file management table 90, and proceeds to S2201 if there is an unprocessed file name. Meanwhile, if there is no unprocessed file name, the migration processing program 14 ends the processing.

After completing the migration of all files from the migration source NAS apparatus 2a to the migration destination NAS apparatus 2b based on the foregoing processing, by setting the IP address of the migration source NAS apparatus 2a to the migration destination NAS apparatus 2b, operation with the migration destination NAS apparatus 2b can be started without having to change the setting of the NAS client 100.

In the second embodiment of the NAS apparatus migration method according to the present invention, the migration server 1 migrates files stored in the share directory of the migration source NAS apparatus 2a to the share directory of the migration destination NAS apparatus 2b in chronological order of the update date and time. Thus, when repeatedly migrating the NAS apparatus on a daily basis based on the migration method of the present invention in a state of continuing the operation of the migration source NAS apparatus 2a, migration of the files that are updated daily will be postponed without having to define the condition of the update date and time of the migration-target file, and there is an effect of being able to quicken the migration progress. In addition, since the migration server 1 performs migration processing by being connected to the migration source NAS apparatus 2a and the migration destination NAS apparatus 2b as a single NAS client, there is no need to add a special function to the migration source NAS apparatus 2a and the migration destination NAS apparatus 2b.

Third Embodiment

The third embodiment of the present invention is now explained with reference to FIG. 17 and FIG. 18.

Figure 17:
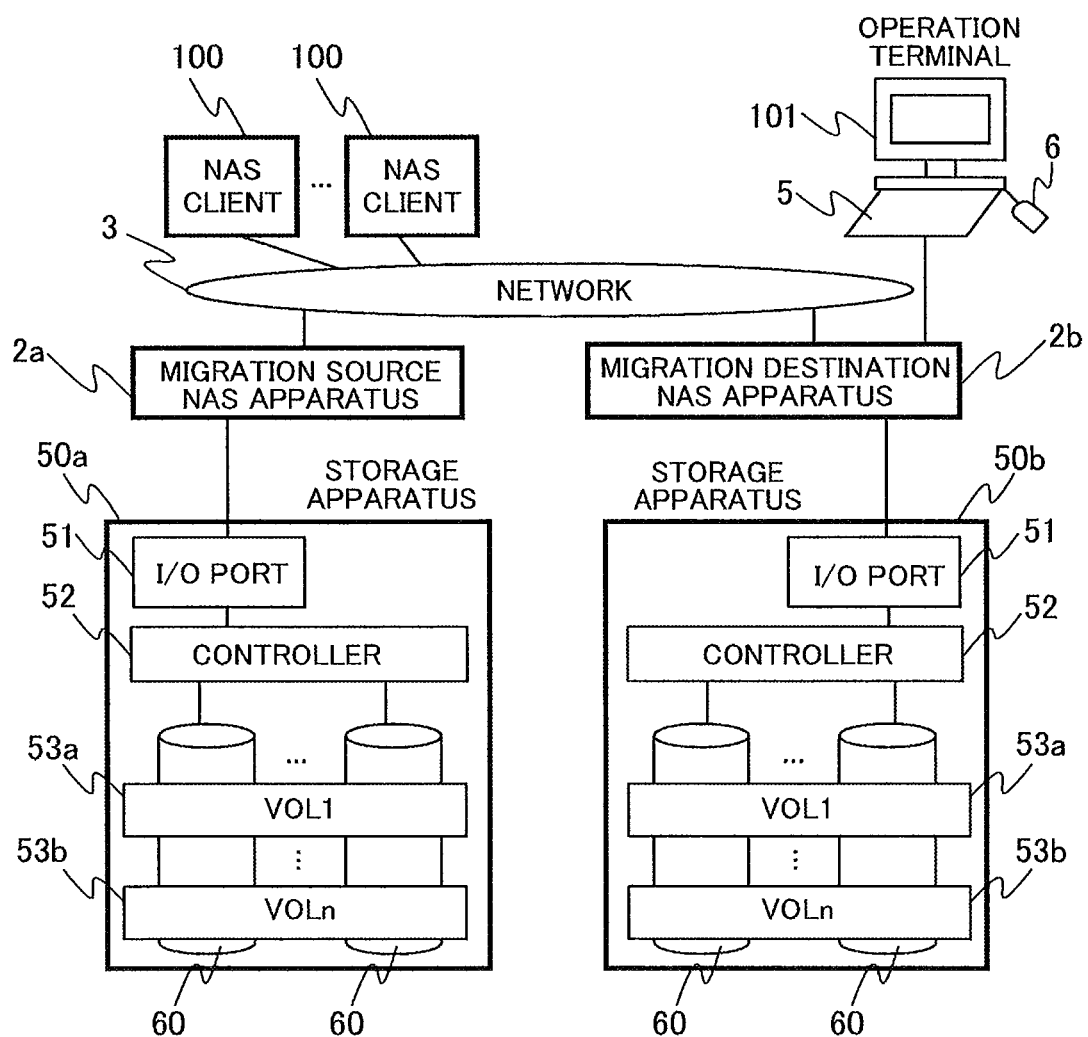
FIG. 17 is a diagram schematically showing the configuration of a storage network system of the third embodiment and the fourth embodiment adopting the NAS apparatus migration method according to the present invention.

FIG. 17 is a configuration example of a system schematically showing the storage network system adopting the third embodiment of the present invention.

As shown in FIG. 17, the storage network system of this embodiment comprises an operation terminal 101, at least one migration source NAS apparatus 2a, a storage apparatus 50a connected to the migration source NAS apparatus 2a, at least one migration destination NAS apparatus 50b, a storage apparatus 3b connected to the migration destination NAS apparatus 2b, a plurality of NAS clients 100 for implementing file access to the migration source NAS apparatus 2a, and a network 3 to which the copy source NAS apparatus 2a, the copy destination NAS apparatus 2b and the NAS client 100 are connected.

The operation terminal 101 is equipped with a keyboard 5, a mouse 6 and the like, and is connected to the migration destination NAS apparatus 2b. The operation terminal 101 may be a standard personal computer with an operating system running thereon. The user uses the operation terminal 101 to edit the schedule table 30 stored in the migration destination NAS apparatus 2b and start up the migration period estimate processing program 17 as described later.

The storage apparatuses 50a, 50b include at least one I/O port 51 for connecting to the migration source NAS apparatus 2a and the migration destination NAS apparatus 2b, a controller 52 for performing control in the storage apparatus, and at least one disk device 60 configuring at least one volume 53. The volume 53 is a volume for providing a file system to the user of the NAS apparatuses 2a, 2b, and stores files and their attribute information.

Figure 18:
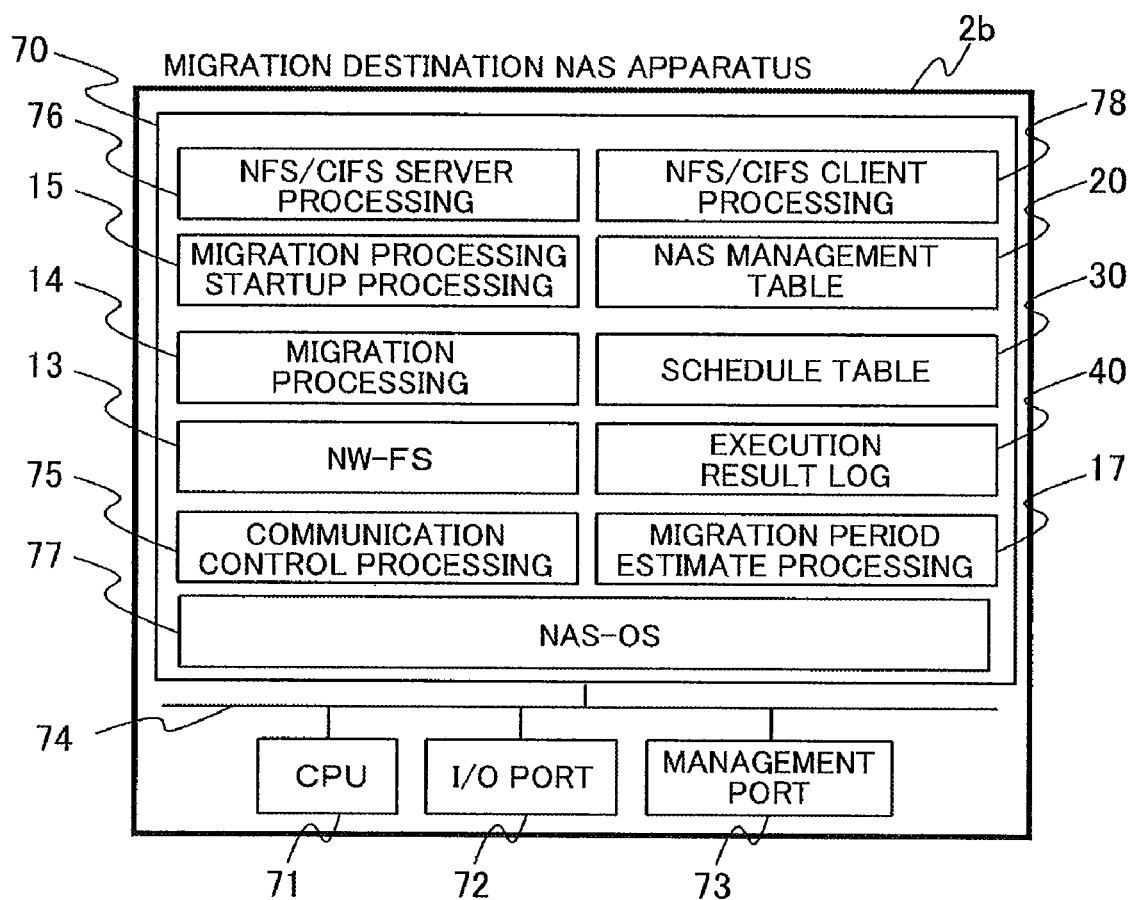
FIG. 18 is a diagram schematically showing the configuration of a migration destination NAS apparatus according to the third embodiment.

FIG. 18 is a diagram schematically showing the configuration example of the migration destination NAS apparatus 2b in the third embodiment. As shown in FIG. 18, the migration destination NAS apparatus 2b comprises a memory 70, a CPU 71, at least one I/O port 72 for connecting to the storage apparatuses 50a, 50b, a management port 73, and an internal bus 74 for connecting the foregoing components 70 to 73. The memory 70 stores a communication control processing program 75 for communicating with a communication protocol of the network 3, an NFS/CIFS server processing program 76 that provides a function for the host computer to access the volumes provided by the migration destination NAS apparatus 2b, an NFS/CIFS client processing program 78 for accessing the file system provided by the migration source NAS apparatus 2a, a migration processing program 14 for implementing the NAS apparatus migration method of the present invention, a migration processing startup processing program 15 for starting up the migration processing program 14, and a migration period estimate processing program 17 for estimating the migration period. The CPU 71 executes these programs. The memory 70 additionally stores a schedule table 30 storing a schedule for the migration processing startup processing program 15 to start up the migration processing program 14, a NAS management table 20 to be used by the migration processing program 14, and an execution result log 40 for outputting the migration result of the migration processing program 14.

In the third embodiment, the migration destination NAS apparatus 2b mounts the file system provided by the migration source NAS apparatus 2a, and the migration processing program 14 of the migration destination NAS apparatus 2b implements the migration processing. Since the processing contents of the migration processing startup processing program 15, the migration processing program 14, and the migration period estimate processing program 17 are the same as the first embodiment, the explanation thereof is omitted.

In the third embodiment of the NAS apparatus migration method according to the present invention, the migration destination NAS apparatus 2b migrates files, other than the files that were updated from a certain specific date and time to the migration start date and time among the files stored in the share directory of the migration source NAS apparatus 2a, to the share directory of the migration destination NAS apparatus 2b. Moreover, the migration performance is calculated based on the file size of the migrated file and the time required for the migration, and the time required for migrating the non-migrated files is calculated based on the file size of the non-migrated files and the migration performance. Thus, the same effect as the first embodiment can be obtained. In addition, there is no need to provide an apparatus other than the NAS apparatus for performing the migration processing.

Fourth Embodiment

The fourth embodiment of the present invention is now explained with reference to FIG. 19. Since the system configuration is the same as the third embodiment, the explanation thereof is omitted.

Figure 19:
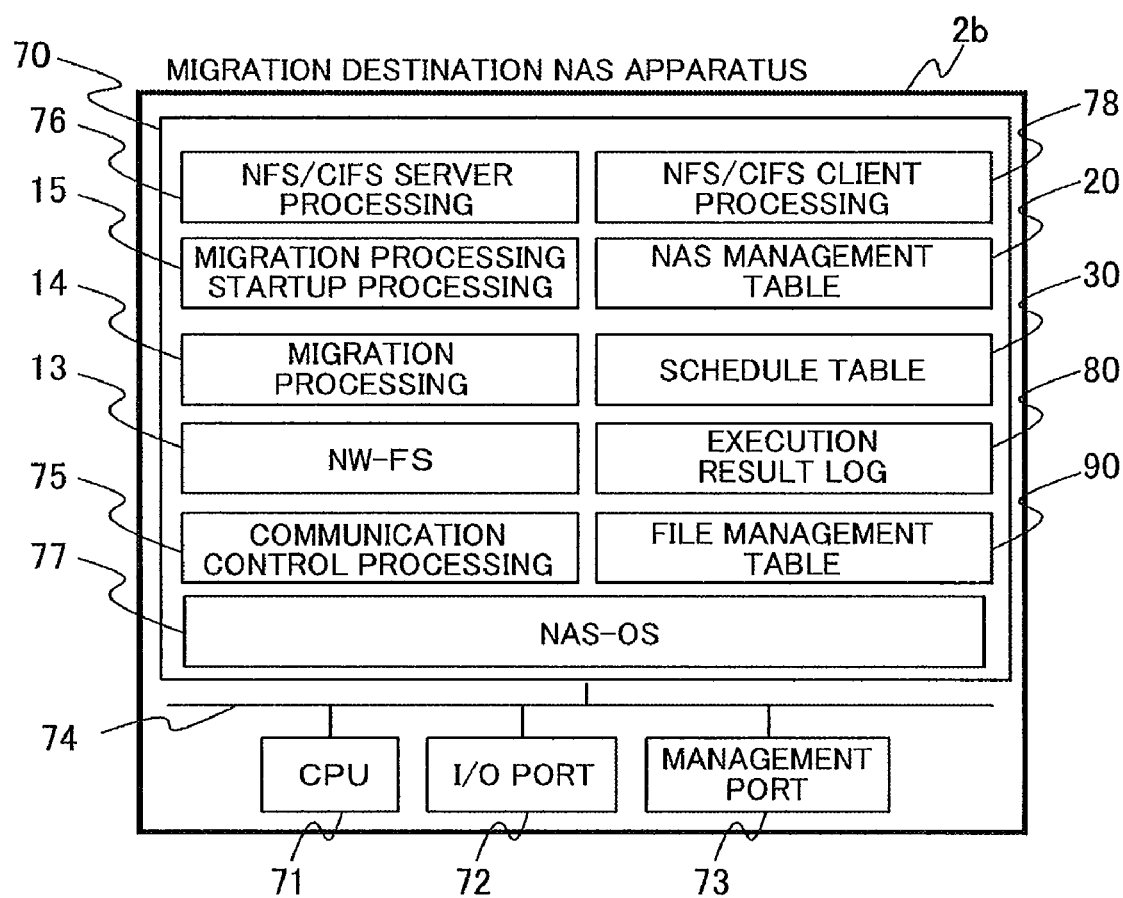
FIG. 19 is a diagram schematically showing the configuration of a migration destination NAS apparatus according to the fourth embodiment.

FIG. 19 is a diagram schematically showing a configuration example of the migration destination NAS apparatus 2b in the fourth embodiment. As shown in FIG. 19, the migration destination NAS apparatus 2b comprises a memory 70, a CPU 71, at least one I/O port 72 for connecting to the storage apparatuses 50a, 50b, a management port 73, and an internal bus 74 for connecting the foregoing components 70 to 73. The memory 70 stores a communication control processing program 75 for communicating with a communication protocol of the network 3, an NFS/CIFS server processing program 76 that provides a function for the host computer to access the volumes provided by the migration destination NAS apparatus 2b, an NFS/CIFS client processing program 78 for accessing the file system provided by the migration source NAS apparatus 2a, a migration processing program 14 for implementing the NAS apparatus migration method of the present invention, and a migration processing startup processing program 15 for starting up the migration processing program 14.

The CPU 71 executes these programs. The memory 70 additionally stores a schedule table 30 storing a schedule for the migration processing startup processing program 15 to start up the migration processing program 14, a NAS management table 20 to be used by the migration processing program 14, an execution result log 40 for outputting the migration result of the migration processing program 14, and a file management table 90 for storing a list of files stored in the share directory of the migration source NAS apparatus 2*a*.

In the fourth embodiment, as with the third embodiment, the migration destination NAS apparatus 2*b* mounts the file system provided by the migration source NAS apparatus 2*a*, and the migration processing program 14 of the migration destination NAS apparatus 2*b* implements the migration processing. Since the processing contents of the migration processing startup processing program 15 and the migration processing program 14 are the same as the second embodiment, the explanation thereof is omitted.

In the fourth embodiment of the NAS apparatus migration method according to the present invention, the migration destination NAS apparatus 2*b* migrates files stored in the share directory of the migration source NAS apparatus 2*a* to the share directory of the migration destination NAS apparatus 2*b* in chronological order of the update date and time. Thus, when repeatedly migrating the NAS apparatus on a daily basis based on the migration method of the present invention in a state of continuing the operation of the migration source NAS apparatus 2*a*, migration of the files that are updated daily will be postponed without having to define the condition of the update date and time of the migration-target file, and there is an effect of being able to quicken the migration progress. In addition, as with the third embodiment, there is no need to provide an apparatus other than the NAS apparatus for performing the migration processing.

According to the NAS apparatus migration method of the present invention explained in the foregoing first to fourth embodiments, only the files that are not updated from a certain specific time up to the implementation of the migration processing are migrated in the migration of the NAS apparatus in a state of continuing the operation of the migration source NAS apparatus. Moreover, a file with old update date and time is preferentially migrated. Thus, even if numerous files are updated in the migration source NAS apparatus, the migration processing can be sped up. Moreover, the migration performance is calculated based on the file size of the migrated file and the time required for the migration, and the time required for migrating the non-migrated files is calculated based on the file size of the non-migrated files and the migration performance. Thus, it is possible to estimate the time required for migrating the non-migrated files (files excluded from migration). Further, since migration processing is implemented while continuing the operation of the migration source NAS apparatus, the latest files will constantly be stored in the migration source NAS apparatus. Thus, the operation of the migration source NAS apparatus can be easily resumed even if the migration processing is unsuccessful due to a failure or the like.

What is claimed is:

1. A file migration method of an information system, the information system including a plurality of Network Attached Storage (NAS) systems, and a computer for reading and writing a plurality of files stored in the NAS systems, wherein the file migration method comprises:
   executing steps of file migration startup processing;
   executing steps of file migration processing; and
   executing steps of file migration termination processing to be executed after execution of the file migration processing,
   wherein the file migration startup processing comprises:
      a step of providing a management table which indicates a plurality of relationships between a source system and a destination system;
      a step of identifying a first NAS system of the NAS systems as the source system of a file migration based on the management table; and
      a step of identifying a second NAS system of the NAS systems as the destination system of the file migration based on the management table,
   wherein the file migration processing comprises:
      a step of acquiring and storing first attribute information including file names, update time information and a Write Only Read Many setting concerning a plurality of files stored in a designated directory of the first NAS system;
      a step of acquiring and storing second attribute information including file names and update time information concerning a plurality of files stored in the second NAS system;
      a step of identifying a file to be copied from the first NAS system to the second NAS system based on the difference between the stored first attribute information and second attribute information, and a prescribed rule which preferentially identifies a file with old update time information of the first attribute information as a file to be copied;
      a step of determining whether the identified file is set Write Only Read Many or not; and
      a step of copying the identified file from the first NAS system to the second NAS system when the identified file is not set Write Only Read Many, and
   wherein the file migration termination processing comprises:
      a step of acquiring and storing third attribute information including file names and update time information concerning a plurality of files to be stored in a designated directory of the first NAS system;
      a step of acquiring and storing fourth attribute information including file names and update time information concerning a plurality of files stored in the second NAS system based on the file migration processing; and
      a step of identifying and copying a file to be copied from the first NAS system to the second NAS system based on the difference between the stored third attribute information and fourth attribute information.

2. The file migration method of an information system according to claim 1,
   wherein, based on a first time obtained by subtracting a predetermined migration exclusion update period from an execution time of the file migration processing and the update time information of the first attribute information, the prescribed rule identifies a file updated after the first time as a copy inhibition target.

3. The file migration method of an information system according to claim 1,
   wherein the step of copying the identified file from the first NAS system to the second NAS system further includes a step of setting a Write Only Read Many to the file copied to the second NAS system according to information concerning the Write Only Read Many setting included in the first attribute information.

4. The file migration method of an information system according to claim 3,
wherein the file migration method further comprises:
a step of identifying a file set with Write Only Read Many from the second attribute information; and
a step of excluding the identified file set with Write Only Read Many from an acquisition target of the first attribute information.

5. The file migration method of an information system according to claim 1,
wherein the step of copying the identified file from the first NAS system to the second NAS system includes a step of recording the copying time and file size of the copied file; and
wherein the file migration method further comprises:
a step of identifying the total file size concerning files to be copied before the end of migration among a plurality of files stored in a designated directory and below of the first NAS system; and
a step of providing migration period information based on the copying time, the file size and the total file size.

6. The file migration method of an information system according to claim 1,
wherein the file migration processing and file migration termination processing are processed with the second NAS system, or a migration computer connected to the first NAS system and the second NAS system.

7. A migration computer coupled to a plurality of Network Attached Storage (NAS) systems and a computer, the migration computer for migrating a plurality of files stored in a designated directory and below of a first NAS system of the plurality of NAS systems to a second NAS system of the plurality of systems, the migration computer comprising:
a processor;
an I/O port; and
a storage area,
wherein the storage area stores programs which cause the processor to execute file migration startup processing, file startup processing, and file migration termination processing, the file migration termination processing to be executed after the execution of the file migration processing,
wherein the file migration startup processing comprises:
a step of providing a management table which indicates a plurality of relationships between a source system and a destination system;
a step of identifying the first NAS system as the source system of a file migration based on the management table; and
a step of identifying the second NAS system as the destination system of the file migration based on the management table,
wherein the storage area further stores:
first attribute information including file names and update time information concerning a plurality of files to be stored in a designated directory of the first NAS system;
second attribute information including file names and update time information concerning a plurality of files stored in the second NAS system; and
a program for causing the processor to identify a file to be copied from the first NAS system to the second NAS system based on the difference between the stored first attribute information and second attribute information, and a prescribed rule which preferentially identifies a file with old update time information of the first attribute information as a file to be copied, determines whether the identified file is set Write Only Read Many or not, and copy the file identified with the I/O port when the identified file is not set Write Only Read Many,
wherein the copying of the identified file from the first NAS system to the second NAS system further includes the setting of a Write Only Read Many to the file copied to the second NAS system according to information concerning the Write Only Read Many setting included in the first attribute information.

8. The migration computer according to claim 7,
wherein, based on a first time obtained by subtracting a predetermined migration exclusion update period from the processing time of the program and the update time information of the first attribute information, the prescribed rule identifies a file updated after the first time as a copy inhibition target.

9. The migration computer according to claim 7,
wherein the program further:
identifies a file set with Write Only Read Many from the second attribute information; and
excludes the identified file set with Write Only Read Many from the acquisition target of the first attribute information.

10. The migration computer according to claim 7,
wherein the copying of the identified file from the first NAS system to the second NAS system of the program includes the recording processing of the copying time and file size of the copied file; and
wherein the program further:
identifies the total file size concerning files to be copied before the end of migration among a plurality of files stored in a designated directory and below of the first NAS system; and
provides migration period information based on the copying time, the file size and the total file size.

11. A program of a migration computer, wherein the program causes the migration computer to:
execute steps of file migration startup processing;
execute steps of file migration processing; and
execute steps of file migration termination processing executed after execution of the file migration processing,
wherein the file migration startup processing causes the migration computer to:
provide a management table which indicates a plurality of relationships between a source system and a destination system;
identify a first NAS system of the NAS systems as the source system of a file migration based on the management table; and
identify a second NAS system of the NAS systems as the destination system of the file migration based on the management table,
wherein the file migration processing causes the migration computer to:
acquire and store first attribute information including file names and update time information concerning a plurality of files to be stored in a designated directory of a first Network Attached Storage (NAS) system coupled to the migration computer;
acquire and store second attribute information including file names and update time information concerning a plurality of files stored in a second NAS system coupled to the migration computer;
identify a file to be copied from the first NAS system to the second NAS system based on the difference between the stored first attribute information and second attribute information, and a prescribed rule which preferentially identifies a file with old update time information of the first attribute information as a file to be copied;

determine whether the identified file is set Write Only Read Many or not;

copy the identified file from the first NAS system to the second NAS system when the identified file is not set Write Only Read Many, wherein the file migration termination processing causes the computer to:

acquire and store third attribute information including file names and update time information concerning a plurality of files to be stored in a designated directory of the first NAS system;

acquire and store fourth attribute information including file names and update time information concerning a plurality of files stored in the second NAS system; and identify and copy one or more files to be copied from the first NAS system to the second NAS system based on the difference between the stored third attribute information and fourth attribute information, and wherein, based on a first time obtained by subtracting a predetermined migration exclusion update period from an execution time of the file migration processing and the update time information of the first attribute information, the prescribed rule identifies a file updated after the first time as a copy inhibition target.

12. The program of a migration computer according to claim 11, wherein the copying of the identified file from the first NAS system to the second NAS system further includes the setting of a Write Only Read Many to the file copied to the second NAS system.

13. The program of a migration computer according to claim 11, wherein the program further causes the migration computer to:

identify a file set with Write Only Read Many from the second attribute information; and execute the identified file set with Write Only Read Many from the acquisition target of the first attribute information.

14. The program of a migration computer according to claim 11, wherein the copying of the identified file from the first NAS system to the second NAS system of the program includes the recording of the copying time and file size of the copied file; and wherein the program further causes the migration computer to:

identify the total file size concerning files to be copied before the end of migration among a plurality of files stored in a designated directory of the first NAS system with the first attribute information; and provide migration period information based on the copying time, the file size and the total file size.

* * * * *